(12) United States Patent
Nihei

(10) Patent No.: US 10,911,804 B2
(45) Date of Patent: Feb. 2, 2021

(54) BITRATE INSTRUCTION DEVICE, BITRATE INSTRUCTION METHOD, AND NON-TRANSITORY RECORDING MEDIUM

(71) Applicant: NEC Corporation, Tokyo (JP)

(72) Inventor: Koichi Nihei, Tokyo (JP)

(73) Assignee: NEC CORPORATION, Tokyo (JP)

(*) Notice: Subject to any disclaimer, the term of this patent is extended or adjusted under 35 U.S.C. 154(b) by 54 days.

(21) Appl. No.: 16/326,044

(22) PCT Filed: Aug. 1, 2017

(86) PCT No.: PCT/JP2017/027856
§ 371 (c)(1),
(2) Date: Feb. 15, 2019

(87) PCT Pub. No.: WO2018/034141
PCT Pub. Date: Feb. 22, 2018

(65) Prior Publication Data
US 2019/0182520 A1 Jun. 13, 2019

(30) Foreign Application Priority Data
Aug. 17, 2016 (JP) .................................. 2016-160018

(51) Int. Cl.
*H04N 7/173* (2011.01)
*H04N 21/24* (2011.01)
(Continued)

(52) U.S. Cl.
CPC ..... *H04N 21/2402* (2013.01); *H04L 65/1003* (2013.01); *H04L 65/4084* (2013.01);
(Continued)

(58) Field of Classification Search
CPC ........... H04N 21/2402; H04N 21/2662; H04N 21/2187
(Continued)

(56) References Cited

U.S. PATENT DOCUMENTS 6,665,705 B1 * 12/2003 Daniels-Barnes ...... H04L 29/06
709/203
8,014,393 B1 * 9/2011 Faheem .................. H04L 47/15
370/390
(Continued)

FOREIGN PATENT DOCUMENTS

JP 2014229956 A 12/2014
WO 2014007166 A1 1/2014

OTHER PUBLICATIONS

ITU-T Recommendation G. 1070, Series G: Transmission Systems and Media, Digital Systems and Networks "Multimedia Quality of Service and performance—Generic and user-related aspects", 2012, 30 pages.
(Continued)

*Primary Examiner* — Michael B. Pierorazio
(74) *Attorney, Agent, or Firm* — Sughrue Mion, PLLC

(57) ABSTRACT

The bitrate instruction device generates a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and calculates an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

19 Claims, 27 Drawing Sheets

(51) Int. Cl.
  *H04N 21/2662* (2011.01)
  *H04L 29/06* (2006.01)
  *H04N 21/2187* (2011.01)

(52) U.S. Cl.
  CPC ......... *H04L 65/80* (2013.01); *H04N 21/2187* (2013.01); *H04N 21/2662* (2013.01)

(58) Field of Classification Search
  USPC ........................................................ 725/116
  See application file for complete search history.

(56) References Cited

U.S. PATENT DOCUMENTS

| | | | | |
|---|---|---|---|---|
| 8,135,040 | B2* | 3/2012 | Cuijpers | H04L 12/1859 370/432 |
| 8,514,891 | B2* | 8/2013 | Green | H04L 29/06027 370/486 |
| 8,887,214 | B1* | 11/2014 | Black | H04N 21/4227 725/90 |
| 9,219,940 | B2* | 12/2015 | Gaillard | H04N 21/23106 |
| 9,264,508 | B2* | 2/2016 | Wolf | H04L 67/2842 |
| 2002/0166124 | A1* | 11/2002 | Gurantz | H04N 7/104 725/78 |
| 2004/0148421 | A1* | 7/2004 | Achtermann | H04L 12/185 709/232 |
| 2004/0210944 | A1* | 10/2004 | Brassil | H04L 12/1895 725/135 |
| 2004/0244058 | A1* | 12/2004 | Carlucci | G06F 3/0482 725/135 |
| 2008/0037420 | A1* | 2/2008 | Tang | H04L 1/1607 370/229 |
| 2008/0098420 | A1* | 4/2008 | Khivesara | G06Q 30/02 725/32 |
| 2009/0025027 | A1* | 1/2009 | Craner | H04N 21/6543 725/32 |
| 2009/0100489 | A1* | 4/2009 | Strothmann | H04N 21/47202 725/114 |
| 2009/0150943 | A1* | 6/2009 | Vasudevan | H04N 21/2385 725/86 |
| 2010/0086020 | A1* | 4/2010 | Schlack | H04N 21/2402 375/240.01 |
| 2010/0131969 | A1* | 5/2010 | Tidwell | H04N 21/4667 725/14 |
| 2010/0169916 | A1* | 7/2010 | Stettner | H04N 21/6405 725/34 |
| 2011/0096713 | A1* | 4/2011 | Rusert | H04N 21/44016 370/312 |
| 2011/0107379 | A1* | 5/2011 | Lajoie | H04L 65/1016 725/87 |
| 2011/0126248 | A1* | 5/2011 | Fisher | H04N 7/17318 725/95 |
| 2011/0188439 | A1* | 8/2011 | Mao | H04N 21/4353 370/312 |
| 2011/0197239 | A1* | 8/2011 | Schlack | H04N 21/2393 725/95 |
| 2011/0302320 | A1* | 12/2011 | Dunstan | H04L 69/22 709/235 |
| 2012/0331513 | A1* | 12/2012 | Yamagishi | H04N 21/8545 725/95 |
| 2013/0007226 | A1* | 1/2013 | White | H04N 21/4383 709/219 |
| 2013/0091521 | A1* | 4/2013 | Phillips | H04N 21/23424 725/35 |
| 2013/0160047 | A1* | 6/2013 | DuBose | H04N 21/812 725/32 |
| 2014/0020037 | A1* | 1/2014 | Hybertson | H04N 21/2365 725/109 |
| 2014/0143823 | A1* | 5/2014 | Manchester | H04L 65/607 725/116 |
| 2014/0241419 | A1* | 8/2014 | Holmer | H04N 21/2402 375/240.03 |
| 2014/0282777 | A1* | 9/2014 | Gonder | H04N 21/64322 725/109 |
| 2014/0282784 | A1* | 9/2014 | Pfeffer | H04N 21/8586 725/112 |
| 2015/0180740 | A1 | 6/2015 | Yoshida | |
| 2016/0286247 | A1* | 9/2016 | Phillips | H04N 21/2381 |
| 2019/0124375 | A1* | 4/2019 | Lundberg | H04N 17/004 |

OTHER PUBLICATIONS

Written Opinion of the International Searching Authority of PCT/JP2017/027856 dated Sep. 19, 2017.
International Search Report of PCT/JP2017/027856 dated Sep. 19, 2017.
Nihei, K., et al., "A QoE-Driven Video Bitrate Control Method for Live Video Streaming on Mobile Uplink", IEICE Technical Report, 2016, pp. 1-6.

* cited by examiner

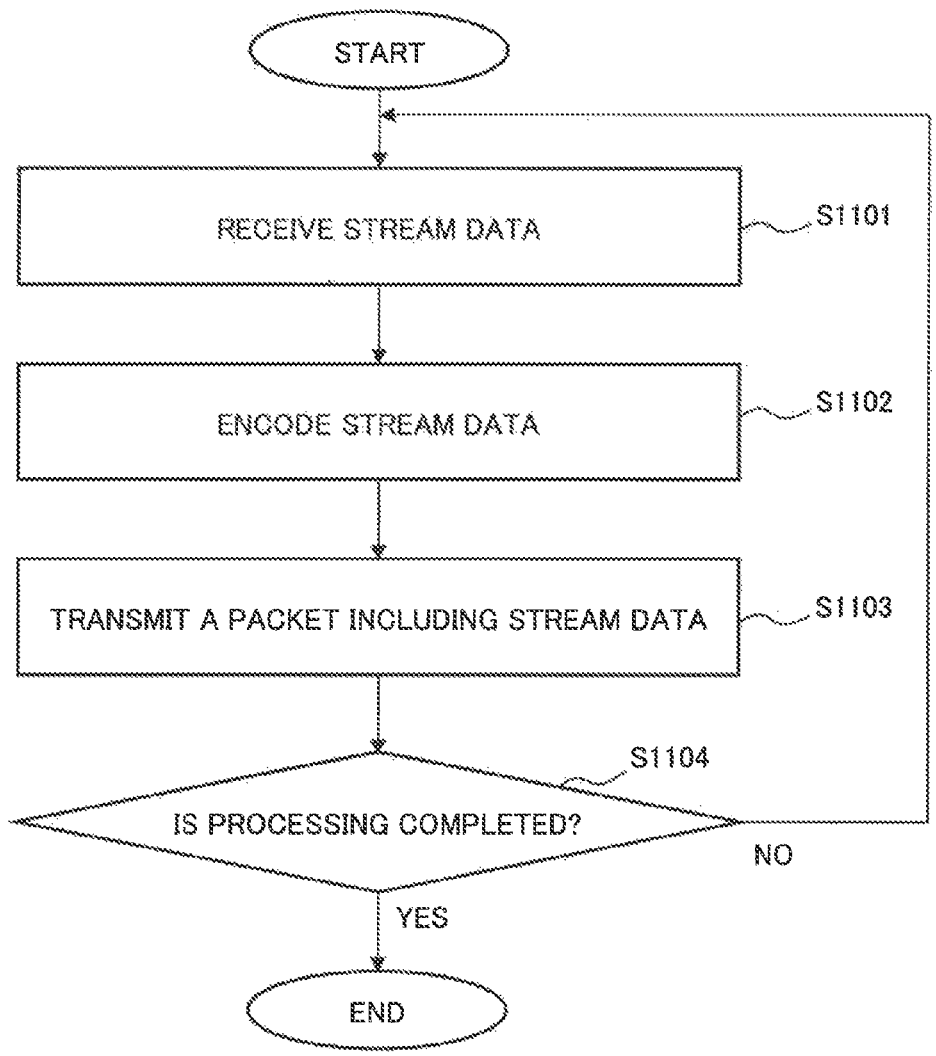

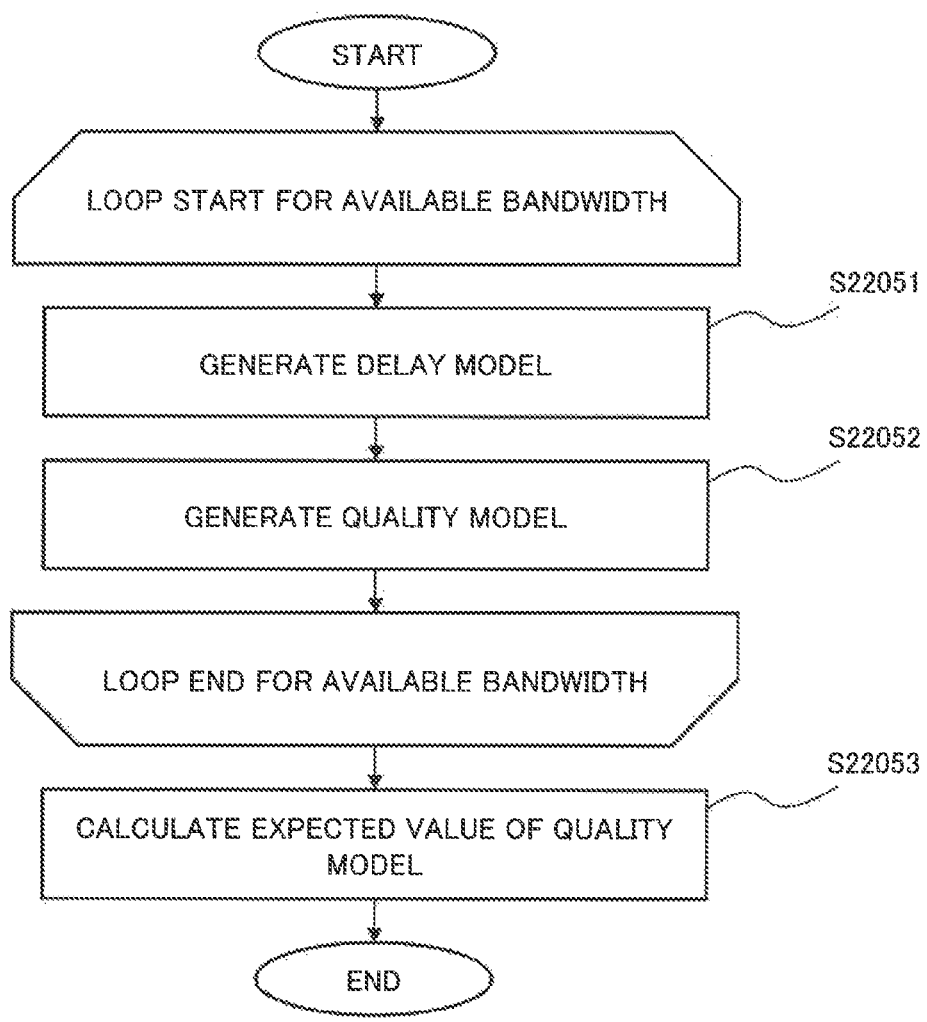

Fig.29

| BANDWIDTH DISTRIBUTION INFORMATION | AVAILABLE BANDWIDTH [Mbps] | [0,1) | [1,2) | [2,3) | [3,4) | [4,5) | [5,∞) | EXPECTED VALUE |
|---|---|---|---|---|---|---|---|---|
| | PROBABILITY | 0.05 | 0.15 | 0.3 | 0.3 | 0.15 | 0.05 | |
| | REPRESENTATIVE VALUE [Mbps] | 0.5 | 1.5 | 2.5 | 3.5 | 4.5 | 5.5 | |
| BITRATE MODEL 1 | | 2.5 | 3.5 | 4.0 | 4.2 | 4.3 | 4.4 | 3.975 |
| BITRATE MODEL 2 | | 3.0 | 3.1 | 3.1 | 3.1 | 3.1 | 3.1 | 3.095 |
| BITRATE MODEL 3 | | 2.0 | 3.0 | 4.0 | 4.5 | 4.6 | 4.7 | 4.025 |

Fig.30

| BANDWIDTH DISTRIBUTION INFORMATION | AVAILABLE BANDWIDTH [Mbps] | [0,1) | [1,2) | [2,3) | [3,4) | [4,5) | [5,∞) | EXPECTED VALUE |
|---|---|---|---|---|---|---|---|---|
| | PROBABILITY | 0.05 | 0.15 | 0.3 | 0.3 | 0.15 | 0.05 | |
| | REPRESENTATIVE VALUE [Mbps] | 0.5 | 1.5 | 2.5 | 3.5 | 4.5 | 5.5 | |
| BITRATE MODEL 1 | | 3.0 | 3.1 | 3.2 | 3.3 | 3.3 | 3.3 | 3.225 |
| BITRATE MODEL 2 | | 2.8 | 3.3 | 3.4 | 3.5 | 3.5 | 3.5 | 3.405 |
| BITRATE MODEL 3 | | 2.6 | 3.0 | 3.5 | 3.6 | 3.7 | 3.8 | 3.455 |
| BITRATE MODEL 4 | | 2.3 | 2.9 | 3.2 | 4.0 | 4.2 | 4.3 | 3.555 |
| BITRATE MODEL 5 | | 2.0 | 2.5 | 2.9 | 3.8 | 4.4 | 4.5 | 3.37 |
| BITRATE MODEL 6 | | 1.5 | 2.0 | 3.0 | 3.5 | 4.0 | 4.6 | 3.155 |

BITRATE INSTRUCTION DEVICE, BITRATE INSTRUCTION METHOD, AND NON-TRANSITORY RECORDING MEDIUM

CROSS REFERENCE TO RELATED APPLICATIONS

This application is a National Stage of International Application No. PCT/JP2017/027856 filed Aug. 1, 2017, claiming priority based on Japanese Patent Application No. 2016-160018 filed Aug. 17, 2016, the disclosures of which are incorporated herein in their entirety.

TECHNICAL FIELD

The present invention, for example, relates to a bitrate instruction device and the like that can control communication in a communication network.

BACKGROUND ART

In a best-effort type communication network such as the Internet and a mobile network, a usable communication network band (communication network bandwidth, hereinafter, an available bandwidth) varies, depending on an influence received from a congestion situation, wireless communication quality, and the like. With regard to such a communication network, there is a technique of controlling a bitrate representing a data volume per time when stream data are communicated, according to a variation of an available bandwidth.

For example, a communication device disclosed in PTL 1 includes an optimum bitrate calculation unit that calculates an optimum bitrate, based on an evaluation function including a delay related to a communication network and a bitrate representing a data volume per time communicated via the communication network, and an available bandwidth estimation unit which estimates an available bandwidth related to the communication network. The optimum bitrate calculation unit calculates, as an optimum bitrate, a bitrate being equal to or less than an available bandwidth calculated by the available bandwidth estimation unit, and having the maximum value of the evaluation function. The optimum bitrate calculation unit probabilistically modifies a value of a bitrate, determines whether a value of an evaluation function increases according to the modified bitrate, and searches for, based on the value of the evaluation function, a bitrate having the maximum value of the evaluation function. The evaluation function is, for example, a function representing quality received by a user (quality of experience).

NPL 1 discloses a method of estimating quality of experience, based on information such as a bitrate, a delay, and a packet loss being observed when video data are communicated.

CITATION LIST

Patent Literature

PTL 1: Japanese Unexamined Patent Application Publication No. 2014-229956
PTL 2: PCT International Publication No. WO 2014/007166

Non-Patent Literature

NPL 1: ITU-T Recommendation G. 1070, "Multimedia Quality of Service and performance-Generic and user-related aspects".

SUMMARY OF INVENTION

Technical Problem

The method disclosed in PTL 1 has a problem that a required time necessary until an evaluation function (e.g. quality of experience) reaches the maximum value, may be long. As a result, according to the method disclosed in PTL 1, a time averaged value of quality of experience may be low. In other words, the method disclosed in PTL 1 has a problem that quality of experience for stream may be poor.

Therefore, one object of the present invention is to provide a bitrate instruction device and the like, which are capable of improving communication quality of information in a short period of time via a communication network.

Solution to Problem

As an aspect of the present invention, a bitrate instruction device including:

quality model generation means for generating a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and bitrate instruction means for calculating an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

In addition, as another aspect of the present invention, a bitrate instruction method including:

generating a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and calculating an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

In addition, as another aspect of the present invention, a bitrate instruction program making a computer achieve:

a quality model generation function for generating a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and a bitrate instruction function for calculating an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

Furthermore, the object is also achieved by a computer-readable recording medium that records the program.

Advantageous Effects of Invention

According to a bitrate instruction device and the like according to the present invention, communication quality of information can be improved in a short period of time.

BRIEF DESCRIPTION OF DRAWINGS

FIG. 3 is a flowchart illustrating a flow of processing in the streaming distribution device according to the first example embodiment.

FIG. 4B is a flowchart illustrating a flow of processing of making an instruction on a bitrate by the streaming distribution device according to the first example embodiment, in accordance with a bitrate model.

FIG. 29 is a diagram conceptually illustrating one example of a value calculated in processing of selecting a bitrate model.

FIG. 30 is a diagram conceptually illustrating one example of a value calculated in processing of selecting a bitrate model.

EXAMPLE EMBODIMENT

Figure 25:
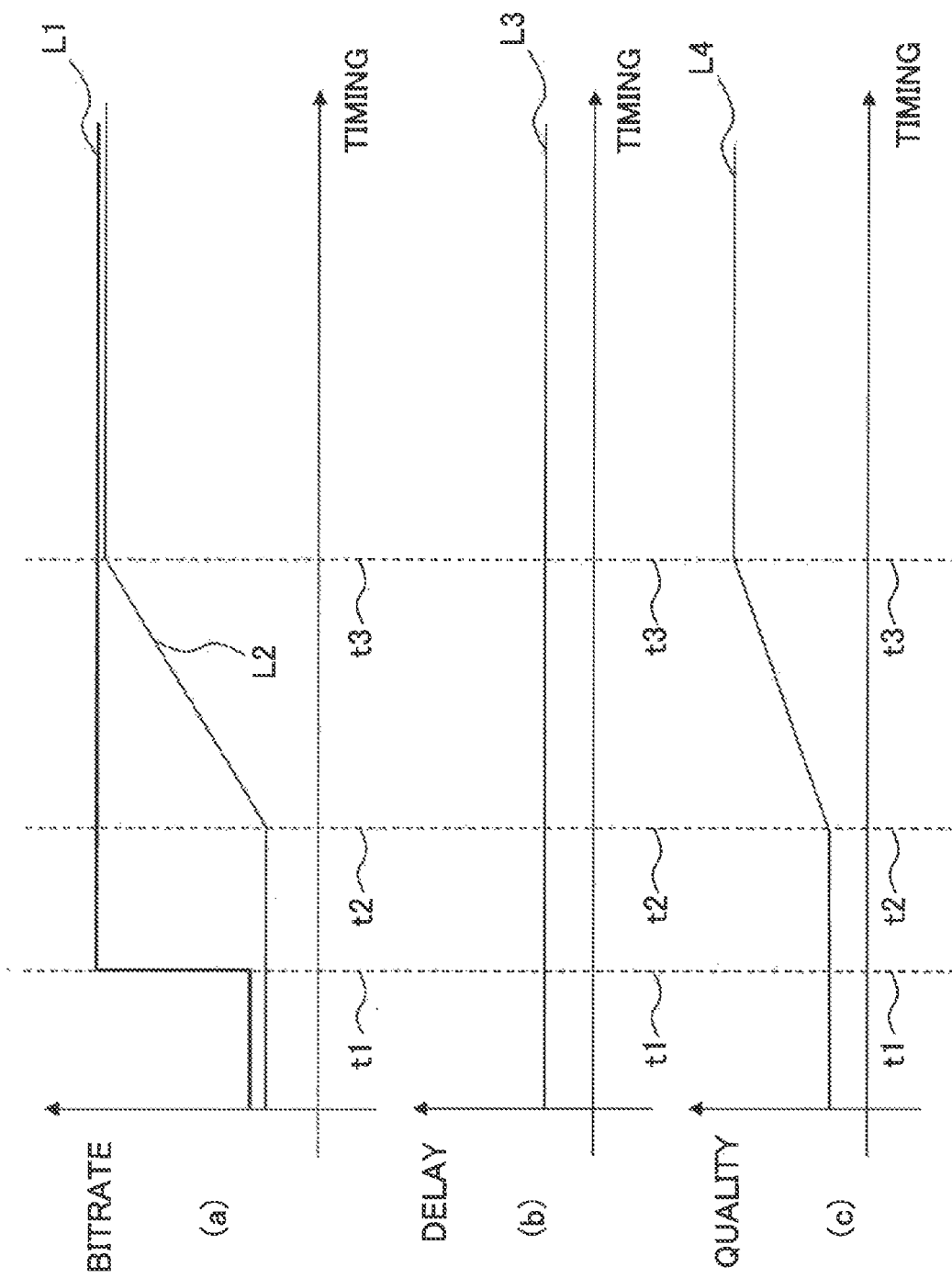
FIG. 25 is a diagram illustrating, with respect to a communication system, a bitrate, a delay degree of communication, and quality of experience representing quality of communication executed via a communication network when the bitrate and the delay are observed.

In order to easily understand the present invention, with reference to FIG. 25, a problem intended to be solved by the present invention will be described in detail. FIG. 25 is a diagram illustrating, with respect to a communication system, a bitrate, a delay degree of communication (e.g. a delay time), and quality of experience representing quality of communication executed via a communication network when the bitrate and the delay are observed. The horizontal axis represents a timing, and indicates that time passes more toward a right side. In (a) of FIG. 25, the vertical axis represents a bitrate, and indicates that a bitrate increases toward an upper side. In (b) of FIG. 25, the vertical axis represents a delay degree, and indicates that a delay degree increases toward an upper side. In (c) of FIG. 25, the vertical axis represents quality of experience, and indicates that quality of experience is better toward an upper side.

In FIG. 25, L1 represents a change of an available bandwidth. L2 represents a change of a bitrate. L3 represents a delay degree (e.g. a delay time). L4 represents quality of experience.

For convenience of description, with respect to a communication system, it is assumed that an available bandwidth L1 increases at a timing t1. It is assumed that, in the communication system, increasing of the available bandwidth at the timing t1 is detected at a timing t2.

The communication device disclosed in PTL 1 probabilistically selects, processing to be executed next among processing that increases a bitrate, processing that does not modify the bitrate, and processing that decreases the bitrate, when, for example, an available bandwidth is modified. The communication device executes, when selecting "increasing processing" at a timing t2, processing of increasing a bitrate in accordance with the selected processing. Referring to (a) of FIG. 25, in a period from the timing t2 to a timing t3, a bitrate L2 increases. This indicates that, for example, the communication device continuously continues to select "increasing processing" in the period from the timing t2 to the timing t3, and thereby the bitrate L2 increases.

Further, when the bitrate L2 exceeds the available bandwidth L1, the communication device disclosed in PTL 1 probabilistically selects processing to be executed next among "non-modification processing" and "decreasing processing". Referring to (a) of FIG. 25, for example, in a period after the timing t3, the bitrate L2 has a fixed value. This indicates that, for example, the communication device continuously continues to select "non-modification processing" in the period after the timing t3, and thereby the bitrate L2 is constant. However, the communication device disclosed in PTL 1 probabilistically selects processing to be executed next, and therefore the bitrate L2 is not always constant.

When a delay L3 is constant as illustrated in (b) of FIG. 25, and in a period from the timing t2 to the timing t3, the bitrate L2 increases as illustrated in (a) of FIG. 25, quality of experience L4 increases in the period ((c) of FIG. 25). In this case, the communication device disclosed in PTL 1 determines that processing of increasing the bitrate L2 is succeeded.

Figure 26:
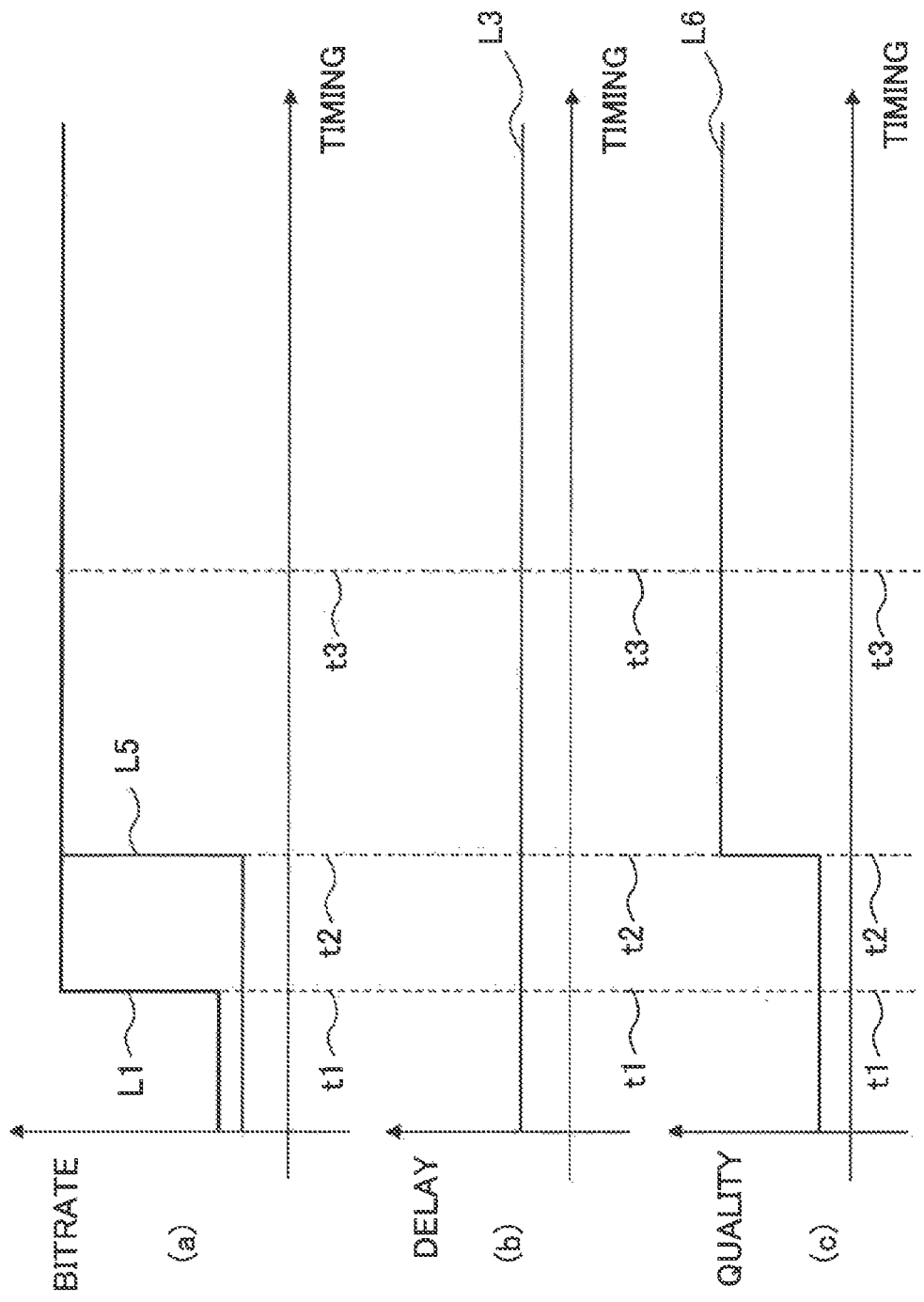
FIG. 26 is a diagram illustrating, with respect to a communication system, a bitrate, a delay degree of communication, and quality of experience representing quality of communication executed via a communication network when the bitrate and the delay are observed.

However, the communication device disclosed in PTL 1 does not always calculate an optimum bitrate for quality of experience. The reason will be described with reference to FIG. 26. FIG. 26 is a diagram illustrating, with respect to a communication system, a bitrate, a delay degree of communication, and quality of experience representing quality related to a communication network when the bitrate and the delay are observed. In FIG. 26, (a), (b), (c), a vertical axis, and a horizontal axis are similar to FIG. 25.

In FIG. 26, L1 represents a change of an available bandwidth. L5 represents a change of a bitrate. L3 represents a delay degree (e.g. a delay time). L6 represents quality of experience.

For convenience of description, with respect to a communication system, it is assumed that an available bandwidth L1 increases at a timing t1. It is assumed that, in the communication system, increasing the available bandwidth L1 at the timing t1 is detected at a timing t2. Further, it is assumed that in the communication system, a bitrate L5 increases up to the available bandwidth L1 at a timing t2. In such a case, the bitrate L5 is an optimum control method.

The bitrate L5 increases up to the available bandwidth L1 at the timing t2, and thereby quality of experience L6 increases at the timing t2. When the quality of experience L4 illustrated in (c) of FIG. 25 and the quality of experience L6 illustrated in (c) of FIG. 26 are compared, in a period from the timing t2 to the timing t3, the quality of experience L4 is lower than the quality of experience L6. In other words, with regard to an average value of quality of experience in a certain period (e.g. the period from the timing t2 to the timing t3), the quality of experience L4 is lower than the quality of experience L6. Therefore, a method for controlling a bitrate as exemplarily illustrated in FIG. 26 is a control method higher in quality of experience than the method disclosed in PTL 1.

Figure 27:
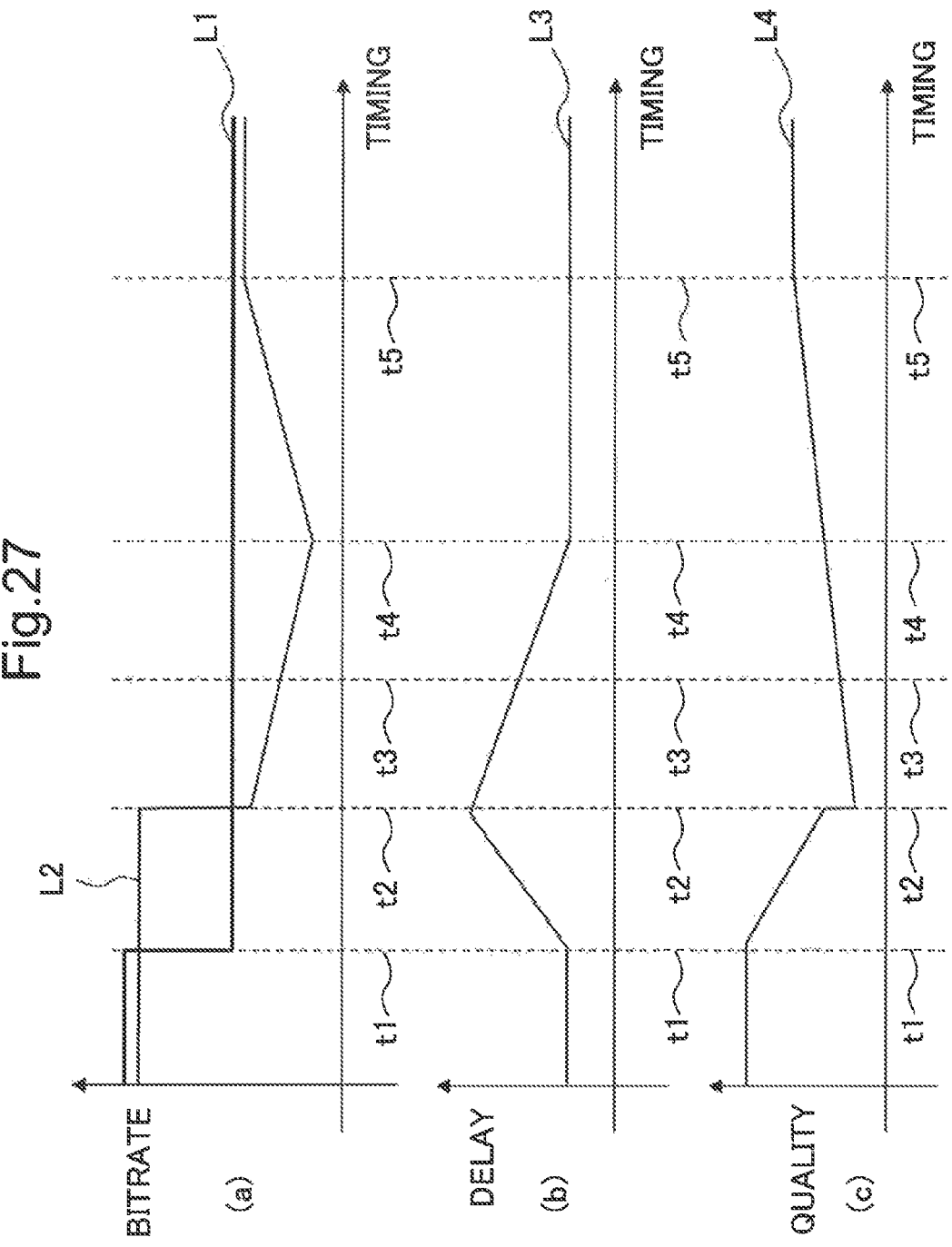
FIG. 27 is a diagram illustrating, with respect to a communication system, a bitrate, a delay degree of communication, and quality of experience representing quality of communication executed via a communication network when the bitrate and the delay are observed.

It will be described that even when an available bandwidth decreases as exemplarily illustrated in FIG. 27, there is a control method higher in quality of experience than the method disclosed in PTL 1. FIG. 27 is a diagram illustrating, with respect to a communication system, a bitrate, a delay degree of communication, and quality of experience representing quality related to a communication network when the bitrate and the delay are observed. In FIG. 27, (a), (b), (c), a vertical axis, and a horizontal axis are similar to FIG. 25.

In FIG. 27, L1 represents a change of an available bandwidth. L2 represents a change of a bitrate. L3 represents a delay degree (e.g. a delay time). L4 represents quality of experience.

For convenience of description, with respect to a communication system, it is assumed that an available bandwidth L1 decreases at a timing t1. It is assumed that, in the communication system, that decreasing the available bandwidth L1 at the timing t1 is detected at a timing t2.

Referring to (a) of FIG. 27, in a period from the timing t1 to the timing t2, a bitrate L2 is higher than the available bandwidth L1. Therefore, data impossible to transmit in the period are temporarily stored in a buffer in a communication system. The data stored in the buffer are communicated in response to a fact that communication is enabled via a communication network, and therefore a delay L3 increases in the period from the timing t1 to the timing t2. As a result, quality of experience L4 decreases in the period from the timing t1 to the timing t2.

For convenience of description, it is assumed that a communication device detects, for example, at a timing t2, that an available bandwidth L1 has decreased at the timing t1, and thereby selects "processing of decreasing" a bitrate L2 down to less than the available bandwidth L1 at the timing t2. In this case, in a period from the timing t2 to a timing t3, the bitrate L2 is less than the available bandwidth L1, and therefore a delay L3 decreases. As a result, in the period from the timing t2 to the timing t3, quality of experience L4 increases.

For convenience of description, it is assumed that a communication device continuously selects "processing of decreasing" a bitrate L2 until processing for data stored in a buffer is completed (assumed to be a period from a timing t3 to a timing t4). In this case, in the period from the timing t3 to the timing t4, the bitrate L2 is less than an available bandwidth L1, and therefore a delay L3 decreases. As a result, in the period from the timing t3 to the timing t4, quality of experience L4 increases.

As exemplarily illustrated in (a) of FIG. 27, it is assumed that a communication device continuously selects "processing of increasing" a bitrate L2 in a period from a timing t4 to a timing t5. In this case, in the period from the timing t4 to the timing t5, the bitrate L2 increases without an increase of a delay L3, and therefore quality of experience L4 increases.

Figure 28:
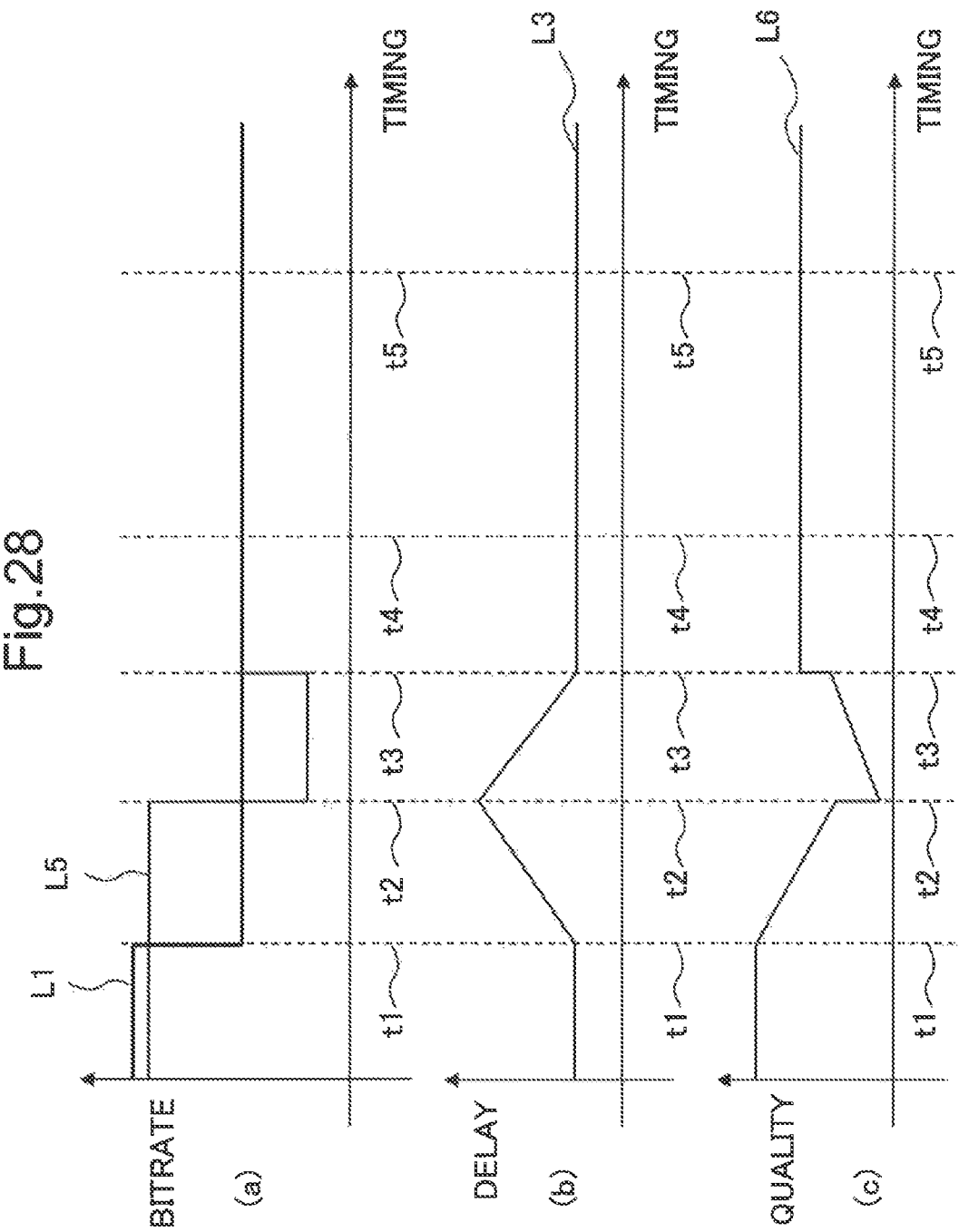
FIG. 28 is a diagram illustrating, with respect to a communication system, a bitrate, a delay degree of communication, and quality of experience representing quality of communication executed via a communication network when the bitrate and the delay are observed.

However, a communication device that controls a bitrate as exemplarily illustrated in FIG. 27 does not always calculate an optimum bitrate for quality of experience. The reason will be described with reference to FIG. 28. FIG. 28 is a diagram illustrating, with respect to a communication system, a bitrate, a delay degree of communication, and quality of experience representing quality related to a communication network when the bitrate and the delay are observed. In FIG. 28, (a), (b), (c), a vertical axis, and a horizontal axis are similar to FIG. 27.

In FIG. 28, L1 represents a change of an available bandwidth. L5 represents a change of a bitrate. L3 represents a delay degree (e.g. a delay time). L6 represents quality of experience.

With regard to bitrates, when a bitrate L2 illustrated in (a) of FIG. 27 and a bitrate L5 illustrated in (a) of FIG. 28 are compared, a communication device decreases the bitrate L5 at a timing t2 down to a value less than the bitrate L2. As a result, when timings for eliminating a delay are compared, the timing is a timing t3 before a timing t4 in case of a delay L3 illustrated in (b) of FIG. 28, while the timing is a timing t4 in case of a delay L3 illustrated in (b) of FIG. 27.

Further, it is assumed that a communication device increases a bitrate L5 up to an available bandwidth L1 at a timing t3 at which a delay has been eliminated. In this case, quality of experience L6 improves at the timing t3. As a result, when quality of experience L6 (exemplarily illustrated in FIG. 28) and quality of experience L4 (exemplarily illustrated in FIG. 27) are compared, in a period from a timing t2 to a timing t5, the quality of experience L4 is lower than the quality of experience L6. In other words, with regard to an average value of quality of experience in a certain period (e.g. the period from the timing t2 to the timing t5), the quality of experience L4 is lower than the quality of experience L6. Therefore, a method for controlling a bitrate as exemplarily illustrated in FIG. 28 is a control method higher in quality of experience than a method for controlling a bitrate as exemplarily illustrated in FIG. 27.

The present inventor found problems as described with reference to FIG. 25 to FIG. 28, and derived a means that solves these problems. Hereinafter, example embodiment of the present invention capable of solving such problems will be described in detail with reference to corresponding drawings.

First Example Embodiment

Figure 1:
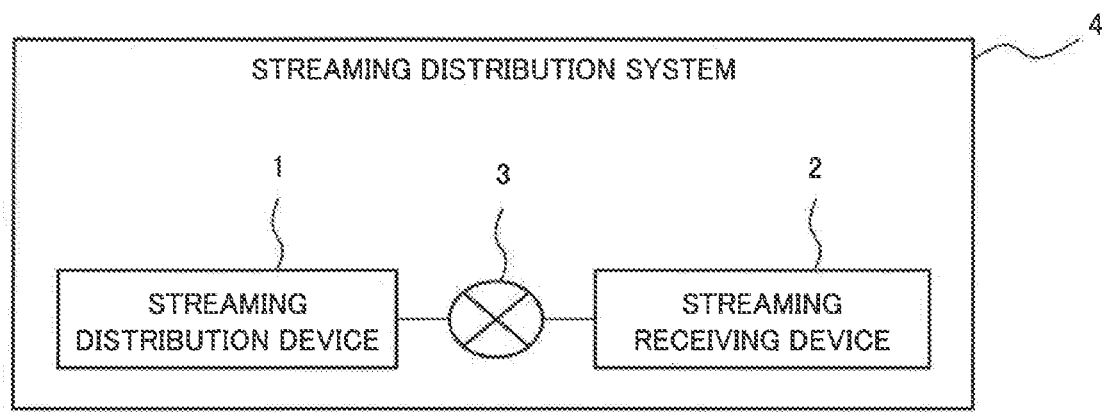
FIG. 1 is a block diagram illustrating a configuration of a streaming distribution system according to a first example embodiment of the present invention.

With reference to FIG. 1, a configuration of a streaming distribution system 4 according to a first example embodiment of the present invention will be described in detail. FIG. 1 is a block diagram illustrating a configuration of the streaming distribution system 4 according to the first example embodiment of the present invention.

The streaming distribution system 4 according to the first example embodiment of the present invention includes a streaming distribution device 1 that distributes stream data, a streaming receiving device 2 that receives stream data, and a communication network 3.

The streaming distribution device 1 and the streaming receiving device 2 can be communicably connected via the communication network 3. The communication network 3 is, for example, the Internet, a mobile communication network, an in-house communication network (intranet), a home local area network (LAN), or a communication network in which these communication networks are combined.

In the streaming distribution system 4, a plurality of streaming receiving devices 2 may be communicably connected to one streaming distribution device 1. Further, the streaming distribution system 4 may include a bidirectional configuration in which stream data are also distributed from the streaming receiving device 2 to the streaming distribution device 1.

Figure 2:
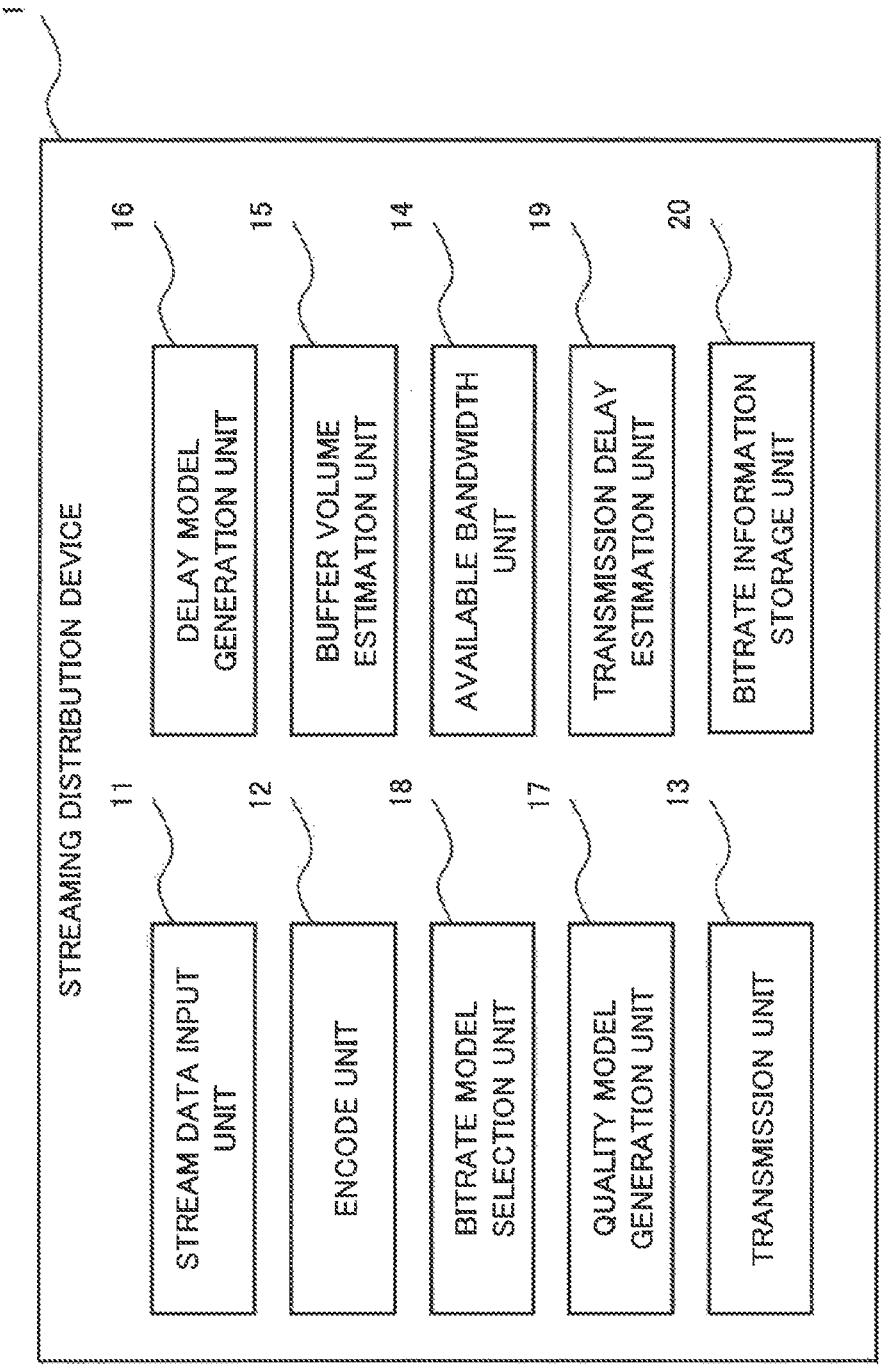
FIG. 2 is a block diagram illustrating a configuration of a streaming distribution device according to the first example embodiment of the present invention.

With reference to FIG. 2, a configuration of the streaming distribution device 1 according to the first example embodiment of the present invention will be described in detail. FIG. 2 is a block diagram illustrating a configuration of the streaming distribution device 1 according to the first example embodiment of the present invention.

The streaming distribution device 1 according to the first example embodiment of the present invention includes a stream data input unit 11, an encode unit (encoder) 12, a transmission unit (transmitter) 13, an available bandwidth unit 14, a buffer volume estimation unit (buffer volume estimator) 15, a delay model generation unit (delay model generator) 16, a quality model generation unit (quality model generator) 17, a bitrate model selection unit (bitrate model selector) 18, a transmission delay estimation unit (transmission delay estimator) 19, and a bitrate information storage unit 20.

The stream data input unit 11 inputs stream data to be a transmission target from an external device (not illustrated). The stream data are, for example, information such as video data, audio data, operation information, sensor information. The external device (not illustrated) is, for example, an image-capture device such as a camera, a microphone, a controller, or a sensor (any of these is not illustrated), or the like. The stream data input unit 11 outputs the input stream data to the encode unit 12.

The encode unit 12 inputs the stream data output by the stream data input unit 11, and executes encode processing of encoding the input stream data, based on an instruction (to be described later) from the bitrate model selection unit 18. The encode unit 12 may execute encode processing, when, for example, video date are input, in accordance with a codec such as H.264, H.265 (HEVC). The encode unit 12 may execute encode processing, when, for example, audio data are input, in accordance with a codec such as G.711, AMR, AAC. The encode unit 12 outputs, to the transmission unit 13, stream data (hereinafter, represented as "encoded stream data") generated by executing encode processing for the stream data.

HEVC represents an abbreviation of High Efficiency Video Coding. ACC represents an abbreviation of Advanced Audio Coding. AMR represents an abbreviation of Adaptive Multi-Rate.

The transmission unit 13 inputs the encoded stream data output by the encode unit 12, generates a packet related to the input encoded stream data, and transmits a generated packet to the streaming receiving device 2. The transmission unit 13 may generate data added with a header such as Real-time Transport Protocol (RTP) for encoded stream data to be a transmission target, and may transmit a packet related to the generated data.

Next, control processing for a bitrate will be described.

With respect to the communication network 3 between the streaming distribution device 1 and the streaming receiving device 2, the available bandwidth unit 14 calculates, for example, a distribution of a communication bandwidth usable in a future (an available bandwidth), and generates bandwidth distribution information including the calculated distribution. The bandwidth distribution information includes, for example, a probability distribution of an available bandwidth, and, in this case, includes information representing a probability that an available distribution is located in a certain range. The available bandwidth unit 14 refers to, for example, a plurality of available bandwidth models representing a change degree of an available bandwidth related to the communication network 3 with a passage of time, calculates a probability that a communication bandwidth represented by each available bandwidth model is located in the certain range at a certain timing, and thereby calculates a distribution of the available bandwidth. The available bandwidth unit 14 outputs the generated bandwidth distribution information to the bitrate model selection unit 18. Hereinafter, a predicted available bandwidth may be represented also as a future available bandwidth.

The buffer volume estimation unit 15 acquires (or estimates, measures) a data volume (hereinafter, refers to "transmission buffer volume") stored in buffers included in the streaming distribution device 1 and each device communicably connected to the communication network 3. The buffer volume estimation unit 15 outputs the acquired (or estimated, measured) data volume to the delay model generation unit 16.

The transmission delay estimation unit 19 acquires (or estimates) a transmission delay upon transmission of data from the streaming distribution device 1 to the streaming receiving device 2. Herein, the transmission delay represents, for example, a required time necessary for transmitting a packet from the streaming distribution device 1 to the streaming receiving device 2. It is assumed that the required time does not include a period of being stored in a buffer. The transmission delay estimation unit 19 outputs the required time, which is acquired (or estimated), to the delay model generation unit 16.

The bitrate model selection unit 18 selects a certain bitrate model from the bitrate information storage unit 20 that stores bitrate information including a plurality of bitrate models conforming to a case of controlling a bitrate. Next, the bitrate model selection unit 18 outputs, for each available bandwidth included in bandwidth distribution information output by the available bandwidth unit 14, at least the selected certain bitrate model and bandwidth distribution information including a probability for the available bandwidth, to the delay model generation unit 16. The bandwidth distribution information is included in an example illustrated in FIG. 29 or FIG. 30 to be described later. Further, the bitrate model selection unit 18 outputs a delay model output by the delay model generation unit 16 and a bitrate model, to the quality model generation unit 17. As described later with reference to FIG. 5 and the like, a bitrate model represents a change (relation) degree of a data volume per time of data communicated via the communication network 3, with a passage of time.

The delay model generation unit 16 inputs a data volume (i.e. a data volume stored in a buffer) output by the buffer volume estimation unit 15, a bitrate model and bandwidth distribution information output by the bitrate model selection unit 18, and a transmission delay output by the transmission delay estimation unit 19. The delay model generation unit 16 calculates, based on the input values, a delay model in accordance with a procedure as described later with reference to Eqn. 1 to Eqn. 5, and the like. The delay model represents a change (relation) degree of a delay time of communication executed via the communication network 3, with a passage of time.

The quality model generation unit 17 inputs a bitrate model output by the bitrate model selection unit 18 and a delay model for the bitrate model, and calculates, based on the input bitrate model and delay model, a quality model in accordance with a procedure as described later with reference to Eqn. 6.

The bitrate model selection unit 18 calculates, based on the quality model calculated by the quality model generation unit 17, quality in a certain period in accordance with a procedure as described later with reference to FIG. 4A and the like.

The bitrate model selection unit 18, the delay model generation unit 16, and the quality model generation unit 17 execute processing as described above for each bitrate model stored in the bitrate information storage unit 20. Thereafter, the bitrate model selection unit 18 calculates a product sum of quality models calculated for combinations of each bitrate model stored in the bitrate information storage unit 20 and each available bandwidth model, and a probability corresponding to a certain available bandwidth among the available bandwidth models, and thereby calculates expected values (average values) of quality for the bitrate models. Processing of calculating an expected value will be described later with reference to FIG. 29, FIG. 30, or the like. Next, the bitrate model selection unit 18 selects, among the bitrate models, for example, a bitrate model in which a calculated expected value of quality is maximum (or, substantially maximum), and requests the encode unit 12 to execute encoding according to the selected bitrate model. Herein, the substantially maximum represents a numerical value falling within a predetermined range from the maximum. The substantially maximum represents, for example, a numerical value falling within a range from (the maximum×0.95) to (the maximum×1.0).

Next, with reference to FIG. 3, processing in the streaming distribution device 1 according to the first example embodiment of the present invention will be described in detail. FIG. 3 is a flowchart illustrating a flow of processing in the streaming distribution device 1 according to the first example embodiment.

The stream data input unit 11 receives stream data, for example, from an external device (not illustrated) (step S1101). When the stream data are video data, the stream data input unit 11 receives stream data for each frame included in the video data. When the stream data are audio information, operation information, sensor information, or the like, the stream data input unit 11 may receive stream data at a fixed cycle such as 20 milliseconds. The stream data input unit 11 outputs the input stream data to the encode unit 12.

Next, the encode unit 12 inputs the stream data output by the stream data input unit 11, and executes encode processing of encoding the input stream data in accordance with a bitrate model output by the bitrate model selection unit 18 (step S1102). The encode unit 12 outputs the encoded stream data representing a result of the encode processing for the stream data, to the transmission unit 13.

The transmission unit 13 inputs the encoded stream data output by the encode unit 12, generates a packet including the input encoded stream data, and transmits the generated packet to the streaming receiving device 2 (step S1103).

The streaming distribution device 1 determines whether or not processing of distributing stream data is completed (step S1104). When processing of distributing stream data is not completed (NO in step S1104), processing described in step S1101 is executed. When processing of distributing stream data is completed (YES in step S1104), the streaming distribution device 1 finishes processing. In other words, the streaming distribution device 1 repeatedly executes processing described in step S1101 to step S1104, until processing for distribution is completed.

Next, with reference to FIG. 4A, processing of making an instruction on a bitrate by the streaming distribution device 1 according to the first example embodiment of the present invention, in accordance with a bitrate model, will be described in detail. FIG. 4A is a flowchart illustrating a flow of processing of making an instruction on a bitrate by the streaming distribution device 1 according to the first example embodiment, in accordance with a bitrate model. The streaming distribution device 1 may execute processing of determining a bitrate model at a predetermined timing (e.g. a fixed cycle, or a cycle of one second), or may execute processing of determining a bitrate model, in response to occurrence of an event such as a rapid change of a communication amount in the communication network 3.

The available bandwidth unit 14 predicts a distribution (e.g. a probability distribution) of a communication bandwidth usable in a future (an available bandwidth), with respect to the communication network 3 between the streaming distribution device 1 and the streaming receiving device 2 (step S2201), and generates bandwidth distribution information including the predicted distribution.

The available bandwidth unit 14 transmits, when predicting a distribution of an available bandwidth, a plurality of packets to the streaming receiving device 2, for example, at a certain timing. The available bandwidth unit 14 divides, based on a size of a plurality of packets and a required time necessary from transmission of the plurality of packets to termination of reception of the plurality of packets by the streaming receiving device 2, the size by the required time, and thereby estimates an available bandwidth at the certain timing. The available bandwidth unit 14 may execute arithmetic processing for time-series information of the estimated available bandwidth (i.e. an available bandwidth model), for example, in accordance with the method disclosed in PTL 2, and thereby may calculate a distribution of an available bandwidth usable in a future.

Alternatively, the available bandwidth unit 14 receives, when estimating an available bandwidth, a plurality of packets transmitted by the streaming receiving device 2 at a certain timing. The available bandwidth unit 14 divides, based on a size of a received packet and a required time necessary from transmission of the plurality of packets by the streaming receiving device 2 to termination of reception of the plurality of packets, the size by the required time, and thereby estimates an available bandwidth at a certain timing. The available bandwidth unit 14 may calculate a distribution of an available bandwidth usable in a future for time-series information of an estimated available bandwidth (i.e. an available bandwidth model), for example, in accordance with the method disclosed in PTL 2.

The buffer volume estimation unit 15 acquires (or estimates) a data volume stored in buffers included in the streaming distribution device 1 and a device (to be described later with reference to FIG. 9) communicably connected to the communication network 3 (step S1202). When, for example, an operating system or the like provides an API which is capable of acquiring a buffer volume, the streaming distribution device 1 may acquire the data volume via the API. Alternatively, it may be possible to measure a round trip time (RTT) when a packet makes a round trip from the streaming distribution device 1 to the streaming receiving device 2, and make estimation from a difference between a current value and the minimum value of the RTT. The API represents an abbreviation of an application programming interface.

The transmission delay estimation unit 19 acquires (or estimates) a transmission delay time representing a required time necessary for transmitting data from the streaming distribution device 1 to the streaming receiving device 2 (step S1203). However, it is assumed that the transmission delay time is a required time not including a processing time via a buffer. The transmission delay estimation unit 19 may calculate, as an estimation value for a transmission delay time, one-half of a round-trip delay time necessary from transmission of a probe packet, such as an ICMP echo to the streaming receiving device 2 by the streaming distribution device 1, to reception of an acknowledgement in response to the probe packet. Further, the transmission delay estimation unit 19 may estimate, as a transmission delay time, half (one-half) of the minimum value of a required time necessary from transmission of a packet by the transmission unit 13 to reception of an acknowledgement transmitted by the streaming receiving device 2 in response to the transmitted packet.

ICMP represents an abbreviation of Internet Control Message Protocol.

Next, the transmission delay estimation unit 19, the quality model generation unit 17, and the bitrate model selection unit 18 calculate an expected value of a quality model for a bitrate model stored in the bitrate information storage unit 20, in accordance with a procedure to be described later with reference to FIG. 6 (step 2205). Processing described in step S2205 is executed for each bitrate model stored in the bitrate information storage unit 20.

Figure 4A:
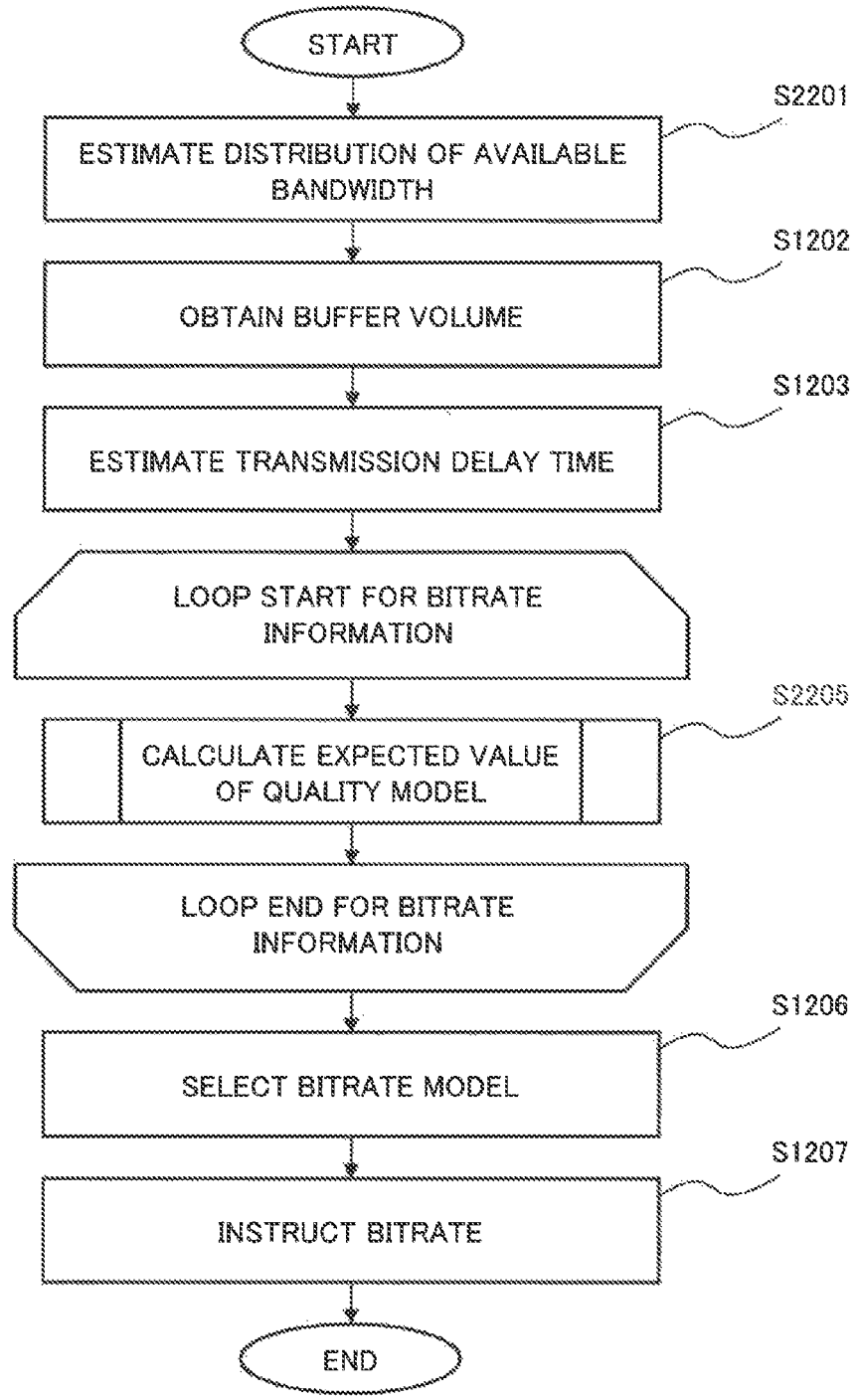
FIG. 4A is a flowchart illustrating a flow of processing of making an instruction on a bitrate by the streaming distribution device according to the first example embodiment, in accordance with a bitrate model.
Figure 5:
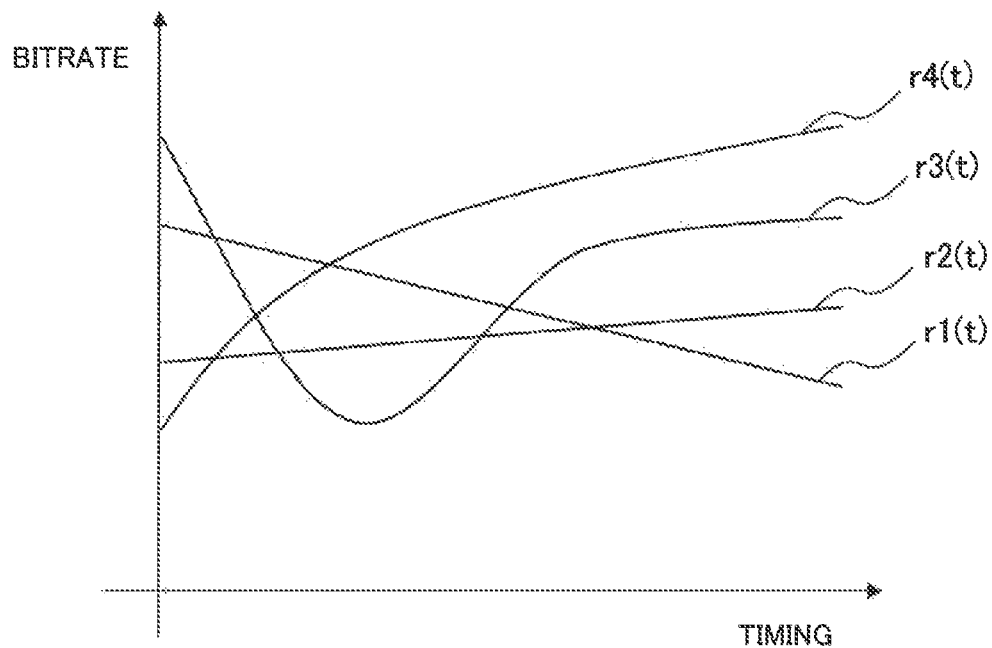
FIG. 5 is a diagram conceptually illustrating one example of a bitrate model in bitrate information stored in a bitrate information storage unit.

With reference to FIG. 4B and FIG. 5, a procedure of calculating, in step S2205, an expected value of a quality model, based on a bitrate model, will be described. FIG. 4B is a flowchart illustrating a detailed flow of processing in step S2205. FIG. 5 is a diagram conceptually illustrating one example of a bitrate model in bitrate information stored in the bitrate information storage unit 20. In FIG. 5, a horizontal axis represents a timing, and indicates that time passes more toward a right side. In FIG. 5, a vertical axis represents a bitrate, and indicates that a bitrate increases toward an upper side.

For convenience of description, it is assumed that a timing for a reference is represented as t0 [second (s)], a transmission delay time related to a communication network at a timing t (wherein, t≥t0) is represented as dT(t), and a value representing an available bandwidth at the timing t is represented as C(t) [bits per second (bps)]. Further, it is assumed that a buffer volume at the timing t is represented as B(t) [bit (bit)], and a bitrate model at the timing t is represented as r(t).

The bitrate information storage unit 20 stores bitrate information including, for example, a bitrate model r1(t), a bitrate model r2(t), a bitrate model r3(t), and a bitrate model r4(t) as exemplarily illustrated in FIG. 5. A bitrate model stored in the bitrate information storage unit 20 is not necessarily limited to a bitrate model as exemplarily illustrated in FIG. 5. Further, the bitrate information storage unit 20 may store more bitrate models. In other words, a bitrate model stored in the bitrate information storage unit 20 is not limited to the bitrate models exemplarily illustrated in FIG. 5.

Referring to FIG. 4B, the delay model generation unit 16 calculates a delay model d(t) for a bitrate model r(t) (e.g. a bitrate model ri(t) exemplarily illustrated in FIG. 5, wherein i=1, 2, 3, or 4) (step S22051). The delay model generation unit 16 adds a transmission delay time dT(t) related to a communication network and a required time dB(t) necessary for processing (i.e. buffering) for a buffer in the communication network, for example, in accordance with processing represented in Eqn. 1, and calculates a delay model d(t). That is:

$$\text{Delay model } d(t)=dT(t)+dB(t) \qquad \text{(Eqn. 1)}$$

Next, processing of calculating, by the delay model generation unit 16, a required time dB(t) necessary for buffering will be described.

The delay model generation unit 16 subtracts, from an input speed representing a speed at which data are stored in a buffer, an output speed representing a speed at which data stored in the buffer are transmitted and then eliminated from the buffer, in accordance with Eqn. 2, and thereby calculates a speed at which data stored in the buffer increase/decrease. That is:

$$\frac{dB(t)}{dt} = r(t) - y(t) \qquad \text{(Eqn. 2)}$$

$$y(t) = \begin{cases} C(t)(B(t) > 0) \\ \min\{r(t), C(t)\}(B(t) = 0) \end{cases}$$

$$B(0) = 0$$

wherein a buffer volume B(t) is equal to or more than 0.

The delay model generation unit 16 solves a differential equation represented in Eqn. 2, and thereby calculates a buffer volume B(t) at a timing t. Next, the delay model generation unit 16 calculates, as a required time dB(t) necessary for buffering, a required time necessary until processing for the buffer volume B(t) stored in a buffer at the timing t is completed. When a timing at which processing for a buffer volume B(t) stored in a buffer is completed is represented as tx, the delay model generation unit 16 calculates a timing tx in accordance with Eqn. 3. That is:

$$\int_t^{tx} c(x)dx = B(t) \qquad \text{(Eqn. 3)}$$

The delay model generation unit 16 subtracts the timing t from the timing tx, and thereby calculates a required time dB(t) necessary for buffering. In other words, the delay model generation unit 16 calculates a required time dB(t) in accordance with Eqn. 4.

$$dB(t)=tx-t \qquad \text{(Eqn. 4)}$$

The delay model generation unit 16 may divide, in accordance with Eqn. 5, a buffer volume B(t) at a timing t by an available bandwidth C(t) at the timing t, and thereby may calculate a required time dB(t) necessary for buffering. That is:

$$dB(t)=B(t) \div C(t) \qquad \text{(Eqn. 5)}$$

Figure 6:
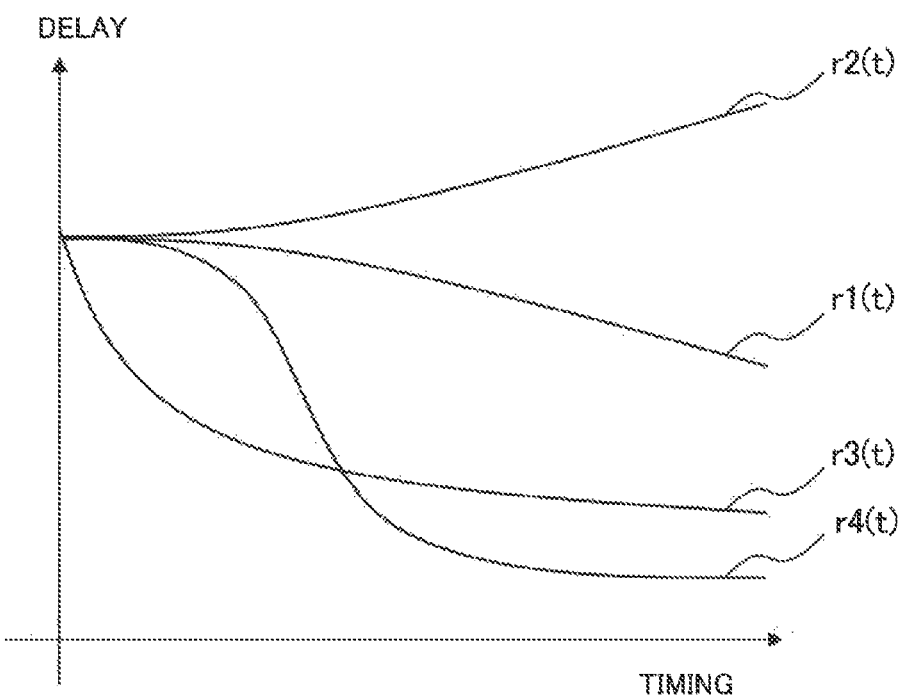
FIG. 6 is a diagram conceptually illustrating one example of a delay model.

The delay model generation unit 16 calculates a delay model illustrated in FIG. 6, for each bitrate model (exemplarily illustrated in FIG. 5) stored in the bitrate information storage unit 20. FIG. 6 is a diagram conceptually illustrating one example of a delay model. In FIG. 6, a horizontal axis represents a timing, and indicates that time passes more toward a right side. In FIG. 6, a vertical axis represents a delay, and indicates that a delay increases toward an upper side. For convenience of description, in FIG. 6, a required time dB(t) calculated for a bitrate model r1(t) is represented by being assigned with a sign "r1(t)". Similarly, a required time dB(t) calculated for a bitrate model r2(t) is represented by being assigned with a sign "r2(t)". A required time dB(t) calculated for a bitrate model r3(t) is represented by being assigned with a sign "r3(t)". A required time dB(t) calculated for a bitrate model r4(t) is represented by being assigned with a sign "r4(t)".

After processing described in step S22051, the quality model generation unit 17 inputs a bitrate model r(t) stored in the bitrate information storage unit 20, and a delay model d(t) calculated, based on the bitrate model r(t), in accordance with Eqn. 1 to Eqn. 5. The quality model generation unit 17 calculates a quality model q(t), for example, in accordance with the method disclosed in PTL 1, with respect to the input bitrate model r(t) and the delay model d(t) (step S22052). For example, as disclosed in PTL 1, the quality model q(t) is a function including, as a parameter, at least a bitrate and a delay time. The quality model generation unit 17 may calculate a quality model q(t), for example, in accordance with a procedure defined in ITU-T G.1070. When a quality model q(t) includes a parameter (e.g. a packet loss rate) other than a bitrate and a delay, the quality model generation unit 17 may use a predetermined value as a value of the parameter. In other words, the quality model generation unit 17 executes processing represented in Eqn. 6 for a timing t, in accordance with a procedure disclosed in PTL 1 or a document such as ITU-T G.1070, and thereby calculates a quality model q(t). That is:

$$q(t)=f(r(t),d(t),\ldots) \qquad \text{(Eqn. 6)}$$

ITU represents an abbreviation of International Telecommunication Union.

Figure 7:
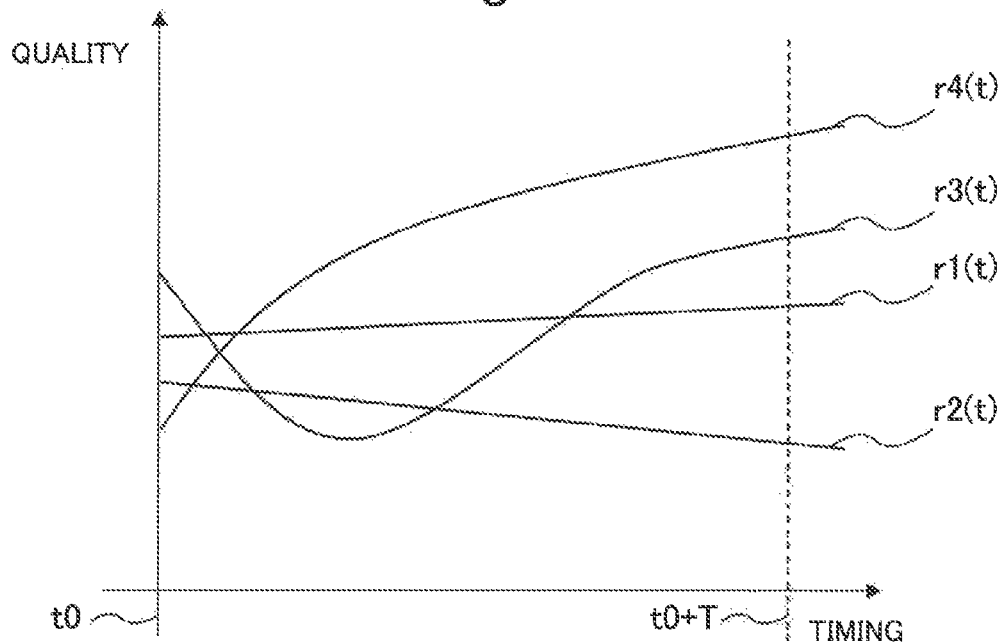
FIG. 7 is a diagram conceptually illustrating one example of a quality of experience model calculated, based on the bitrate model exemplary illustrated in FIG. 5 and the delay model exemplarily illustrated in FIG. 6.

The quality model generation unit 17 calculates a quality of experience model as exemplarily illustrated in FIG. 7, in accordance with Eqn. 6. FIG. 7 is a diagram conceptually illustrating one example of a quality of experience model calculated, based on the bitrate model exemplary illustrated in FIG. 5 and the delay model exemplarily illustrated in FIG. 6. In FIG. 7, a horizontal axis represents a timing, and indicates that time passes more toward a right side. In FIG. 7, a vertical axis represents quality, and indicates that quality is better (increases) toward an upper side. For convenience of description, in FIG. 7, a quality of experience model calculated for a bitrate model r1(t) is represented by being assigned with a sign "r1(t)". Similarly, a quality of experience model calculated for a bitrate model r2(t) is represented by being assigned with a sign "r2(t)". A quality of experience model calculated for a bitrate model r3(t) is represented by being assigned with a sign "r3(t)". A quality of experience model calculated for a bitrate model r4(t) is represented by being assigned with a sign "r4(t)".

Processing described in step S22051 and step S22052 (FIG. 4B) is executed for each available bandwidth included in bandwidth distribution information generated in step S2201 (FIG. 4A). In other words, the quality model generation unit 17 executes processing described in step S22051 and step S22052 for a plurality of C(t)s, with respect to each bitrate model.

Next, the quality model generation unit 17 calculates an expected value of a quality model, for example, in accordance with Eqn. 13 to be described later (step S22053). It is assumed that p(x) denotes a probability density function in case that an available bandwidth is x. It is assumed that q(t,x) denotes a quality model in case that an available bandwidth is x. The quality model generation unit 17 calculates an expected value E(q(t)) of a quality model in accordance with Eqn. 13. That is:

$$E(q(t)) = \int_0^\infty q(t,x) p(x) dx \qquad \text{(Eqn.13)}$$

Processing described in step S2205 in FIG. 4A does not always need to be executed for a continuous time, and may be executed for a timing t provided discretely. In this case, the delay model exemplarily illustrated in FIG. 6 and the quality model exemplarily illustrated in FIG. 7 are calculated only for the timing t provided discretely. However, for convenience of description, in FIG. 5 to FIG. 7, a delay model, a bitrate model, and a quality model are represented as a continuous function.

Processing described in step S2205 in FIG. 4A is executed for each bitrate model stored in the bitrate information storage unit 20. Thereafter, the bitrate model selection unit 18 selects, based on a calculated quality model, a certain bitrate model among bitrate models included in bitrate information stored in the bitrate information storage unit 20 (step S1206). The bitrate model selection unit 18 selects, among bitrate models stored in the bitrate information storage unit 20, for example, a bitrate model in which an average value of the function is maximum (or substantially maximum) with respect to a calculated quality of experience model. In this case, the bitrate model selection unit 18 may calculate an integrated value in which a quality model q(t) in a period from a timing t0 to (t0+(a fixed time T) [s]) is integrated, and may select a bitrate model in which the calculated integrated value is maximum (or substantially maximum). The bitrate model selection unit 18 calculates an integrated value (i.e. an expected value E(q(t))) of a quality model, for example, in accordance with a procedure of calculating a numerical integration.

In the example illustrated in FIG. 7, the bitrate model selection unit 18 selects, for example, a bitrate model r4(t) in which an integrated value of a quality model in an interval [t0,t0+T] (i.e. an interval from t0 to "t0+T") is maximum (or substantially maximum).

While, in the above description, having calculated an expected value of a quality model and thereafter calculated an integrated value with respect to each bitrate model, the bitrate model selection unit 18 may determine an expected value for an integrated value of a quality model. Therefore, processing in the bitrate model selection unit 18 is not limited to the example described above. The bitrate model selection unit 18 may select a bitrate model in which a value of Eqn. 14 is maximum.

$$\int_0^\infty [\int_0^T q(t,x) dt] p(x) dx \qquad \text{(Eqn. 14)}$$

With reference to FIG. 29, processing of selecting a bitrate model will be described. FIG. 29 is a diagram conceptually illustrating one example of a value calculated in processing of selecting a bitrate model. In the example illustrated in FIG. 29, a bitrate model is selected among three bitrate models (i.e. a bitrate model 1 to a bitrate model 3).

Values included in first to third rows in FIG. 29 represent one example of bandwidth distribution information. For example, in a first column of the bandwidth distribution information, an available bandwidth "[0,1)", a probability "0.05", and a representative value "0.5" are described. This indicates that in the bandwidth distribution information, a representative value of the available bandwidth is 0.5 (i.e. an average of the available bandwidth) in which a probability that the available bandwidth is equal to or more than 0 megabits per second (Mbps) and less than 1 Mbps is 5%. With regard to an expression of an available bandwidth, square brackets "[" and "]" represent a closed interval. With regard to an expression of an available bandwidth, parentheses "(" and ")" represent an open interval. Similarly, in a third column of the bandwidth distribution information, an available bandwidth "[2,3)", a probability "0.3", and a representative value "2.5" are described. This indicates that in the bandwidth distribution information, a representative value of an available bandwidth is 2.5 (i.e. an average of the available bandwidth) in which a probability that the available bandwidth is equal to or more than 2 Mbps and less than 3 Mbps is 30%.

Next, the bitrate model selection unit 18 calculates, with respect to each bitrate model, an integrated value of a quality model for representative values of each available bandwidth in bandwidth distribution information. In FIG. 29, an integrated value (i.e. an integrated value of a quality model) calculated by the bitrate model selection unit 18, for a certain bitrate model, is associated with an identifier for identifying the certain bitrate model (e.g. a row listed for a "bitrate model 2"). The bitrate model selection unit 18 calculates a product sum of an integrated value calculated for each available bandwidth and a probability for the available bandwidth, and thereby calculates an expected value of a quality model for a bitrate model (a column listed for an "expected value" in FIG. 29). In the example illustrated in FIG. 29, it is described that, for example, in an area corresponding to a row listed for the "bitrate model 2" and a column listed for the "expected value", an expected value "3.095" is described. This indicates that an expected value of a quality model for the bitrate model 2 is 3.095. In the example illustrated in FIG. 29, the bitrate model selection unit 18 selects, among the three bitrate models, a bitrate model 3 having the maximum expected value of a quality model.

While, in the example illustrated in FIG. 29, the bitrate model selection unit 18 calculated an expected value of a quality model, based on a probability for each 1 Mbps interval, an interval in which the bitrate model selection unit 18 calculates a probability may not be necessarily a 1 Mbps interval. As, for example, the interval (i.e. a pitch width) is smaller, a quality model is more accurately represented, and therefore the bitrate model selection unit 18 can more accurately calculate an expected value of a quality model.

Further, a pitch width may be determined according to processing remaining power (or a processing ability) related to an information processing device that actually executes processing of calculating an expected value. For example, the available bandwidth unit 14 may calculate an expected value, based on a probability calculated by using a fine pitch width when processing remaining power is large, and may calculate an expected value, based on a probability calculated by using a coarse pitch width when processing remaining power is small. In this case, according to the streaming distribution device 1 according to the present example embodiment, an expected value of a quality model can be accurately calculated according to processing remaining power.

Figure 8:
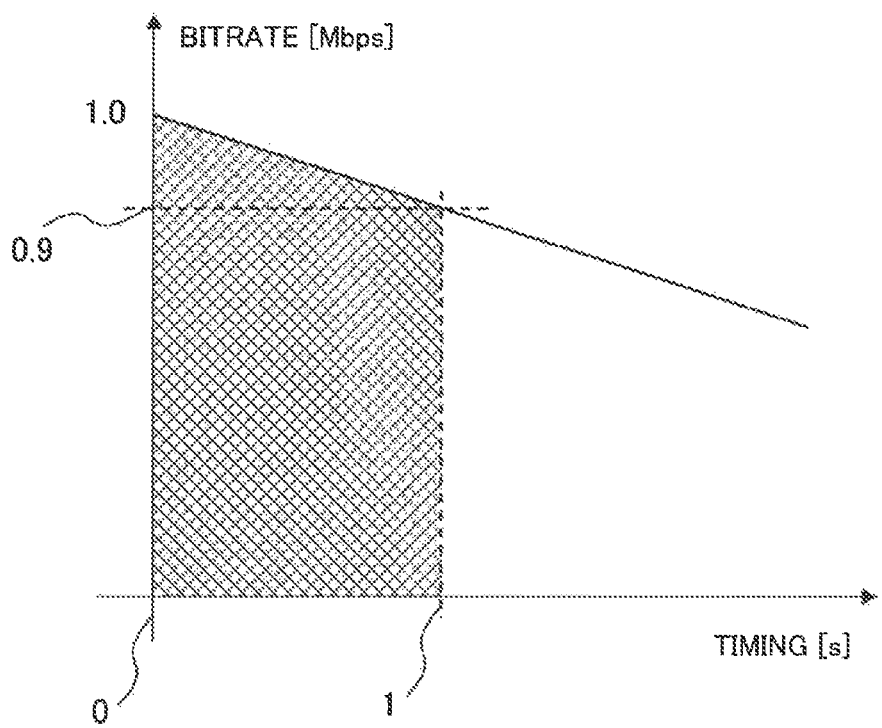
FIG. 8 is a diagram conceptually illustrating one example of a bitrate model.

The bitrate model selection unit 18 makes an instruction to the encode unit 12 on request information for requesting control of a bitrate in accordance with a selected bitrate model (step S1207). The bitrate model selection unit 18 may output a selected bitrate model, or may output a parameter of the bitrate model or a numerical value representing a bitrate, to the encode unit 12. The bitrate model selection unit 18 may calculate, when, for example, a selected bitrate model r(t) is "−0.1×t+1.0 [Mbps]", an integrated value (a shaded portion in FIG. 8 (in the case of this example, 0.95 Mbps)) of the bitrate model r(t) in an interval from a timing 0 to a timing 1, and may output the calculated expected value to the encode unit 12. FIG. 8 is a diagram conceptually illustrating one example of a bitrate model. In FIG. 8, a horizontal axis represents a timing, and indicates that time passes more toward a right side. In FIG. 8, a vertical axis represents a bitrate, and indicates that a bitrate increases toward an upper side.

The encode unit 12 inputs a bitrate model (or an integrated value or a value of a parameter) calculated by the bitrate model selection unit 18. The encode unit 12 selects, according to stream data to be input, a codec type for encoding the stream data. When a bitrate settable for a codec type is previously determined, the encode unit 12 may select, among bitrate models settable for the selected codec type, a bitrate model, based on an input bitrate model (or an integrated value or a value of a parameter). For example, in audio codecs, a bitrate is set as 64 kilobits per second (kbps) for G.711, a bitrate is set as 16, 24, 32 or 48 kbps for G.726, and a bitrate is set as 8 kbps for G.729. In this case, the encode unit 12 may select, for example, a codec type for a bitrate closest to an input integrated value.

Next, an advantageous effect of the streaming distribution system 4 according to the first example embodiment of the present invention will be described.

The streaming distribution system 4 according to the first example embodiment can improve communication quality of information (data) in a short period via a communication network. The reason is that a bitrate covering a longer period than the communication device disclosed in PTL 1 is calculated, and thereby communication can be controlled in accordance with the calculated bitrate. Therefore, the number of times of control of communication decreases compared with the communication device disclosed in PTL 1. Accordingly, the streaming distribution system 4 of the present example embodiment enables to improve communication quality of information in a short period.

Further, a bitrate model having a maximum (or substantially maximum) quality of experience model is selected, and thereby communication having more excellent quality can be achieved. The reason is that the streaming distribution system 4 selects, among bitrate models included in bitrate information, a bitrate model having a maximum (or substantially maximum) expected value of a quality model.

Second Example Embodiment

Next, a second example embodiment of the present invention, based on the first example embodiment described above, will be described.

In the following description, a characteristic portion according to the present example embodiment will be mainly described, and a component similar to a corresponding component of the first example embodiment described above is assigned with the same reference sign, and thereby overlapping description will be omitted.

Figure 9:
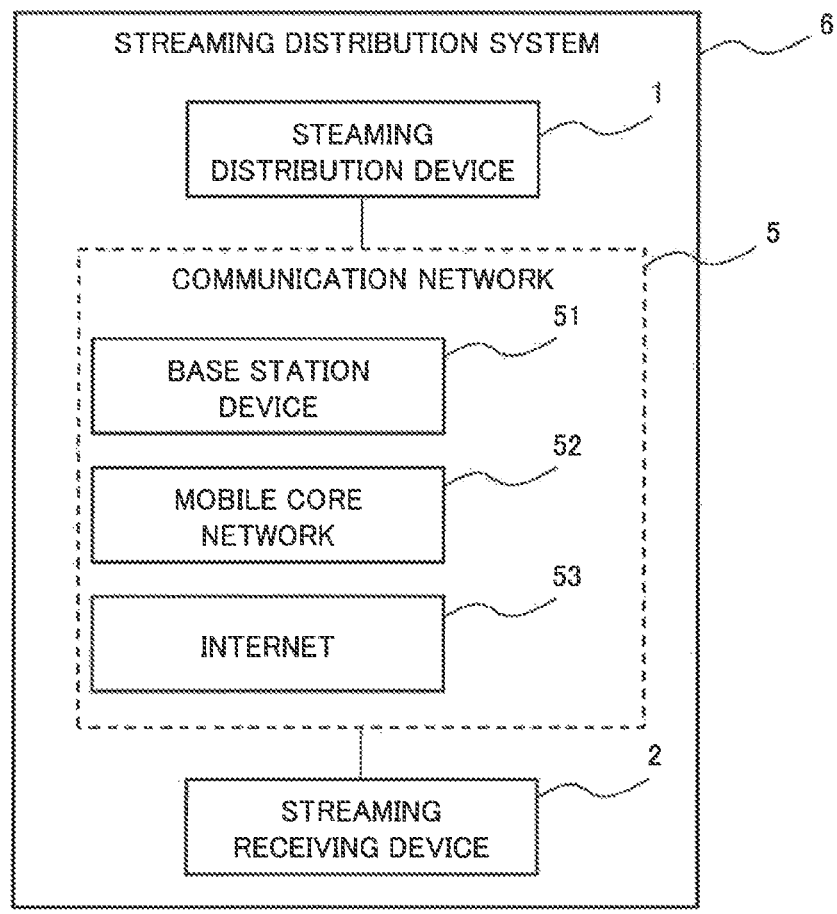
FIG. 9 is a block diagram illustrating a configuration of a streaming distribution system according to a second example embodiment of the present invention.

With reference to FIG. 9, a configuration of a streaming distribution system 6 according to the second example embodiment of the present invention will be described in detail. FIG. 9 is a block diagram illustrating a configuration of the streaming distribution system 6 according to the second example embodiment of the present invention.

The streaming distribution system 6 according to the second example embodiment of the present invention includes a streaming distribution device 1 that distributes stream data, a streaming receiving device 2 that receives stream data, and a communication network 5.

The streaming distribution device 1 and the streaming receiving device 2 can be communicably connected via the communication network 5. In the streaming distribution system 6, a plurality of streaming receiving devices 2 may be communicably connected to one streaming distribution device 1. Further, the streaming distribution system 6 may include a bidirectional configuration in which stream data are also distributed from the streaming receiving device 2 to the streaming distribution device 1.

The communication network 5 according to the second example embodiment includes a base station device 51, a mobile core network 52, and the Internet 53. The streaming distribution device 1 is a device including, for example, a smartphone (or a personal computer) and a communication device communicably connected via an interface such as a USB. In the streaming distribution system 6, the communication network 5 capable of communicably connecting the streaming distribution device 1 and the base station device 51 is, for example, a communication network on a wireless basis (hereinafter, represented as a "wireless communication network"). The base station device 51 manages wireless resources configuring the wireless communication network. A USB represents an abbreviation of a universal serial bus.

The streaming distribution device 1 will be described. The streaming distribution device 1 according to the second example embodiment includes a configuration similar to the streaming distribution device 1 according to the first example embodiment illustrated in FIG. 2.

Figure 10:
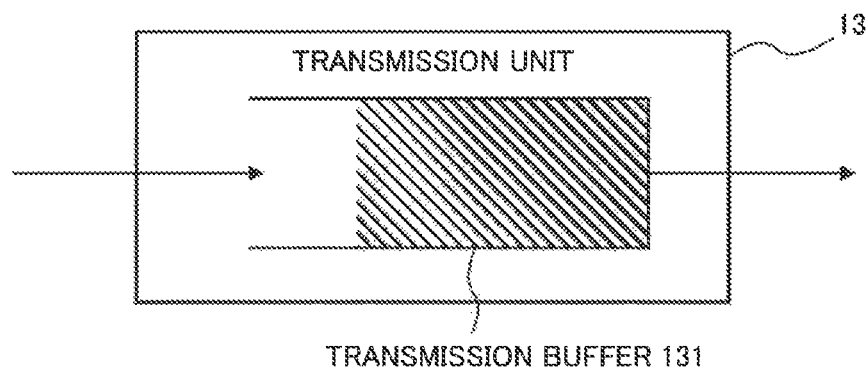
FIG. 10 is a diagram conceptually illustrating one example of a configuration of the transmission unit in a streaming distribution device according to the second example embodiment.

A stream data input unit 11 is, for example, an image-capture device such as a camera incorporated in (or connected to) a smartphone and the like, or an input device such as a microphone or a sensor. A transmission unit (transmitter) 13 is, for example, a smartphone, or a communication modem or the like incorporated in a communication device. Further, an encode unit (encoder) 12, an available bandwidth unit 14, a buffer volume estimation unit (buffer volume estimator) 15, a delay model generation unit (delay model generator) 16, a quality model generation unit (quality model generator) 17, a bitrate model selection unit (bitrate model selector) 18, and a transmission delay estimation unit (transmission delay estimator) 19 each are a function achieved by a program executed, for example, by a processor included in a smartphone or the like. A transmission unit 13 includes a transmission buffer 131 as exemplarily illustrated in FIG. 10. FIG. 10 is a diagram conceptually illustrating one example of a configuration of the transmission unit 13 in the streaming distribution device 1 according to the second example embodiment.

The transmission buffer 131 has a queue structure where input data are processed on a first-in-first-out basis. The transmission unit 13 inputs, for example, encoded stream data output by the encode unit 12, generates a packet including the input encoded stream data, and temporarily stores the generated packet in the transmission buffer 131. The transmission unit 13 reads, among packets stored in the transmission buffer 131, a packet stored first, in accordance with allocation of a wireless resource by the base station device 51 (FIG. 9), and transmits the read packet via the communication network 5. In this case, the transmission unit 13 eliminates the transmitted packet from the transmission buffer 131.

Therefore, when a volume of encoded stream data input from the encode unit 12 is larger than a data volume transmittable by using a wireless resource allocated by the base station device 51, a data volume stored in the transmission buffer 131 increases. When a volume of encoded stream data input from the encode unit 12 is smaller than a data volume transmittable by using the wireless resource allocated by the base station device 51, a data volume stored in the transmission buffer 131 decreases.

Figure 11:
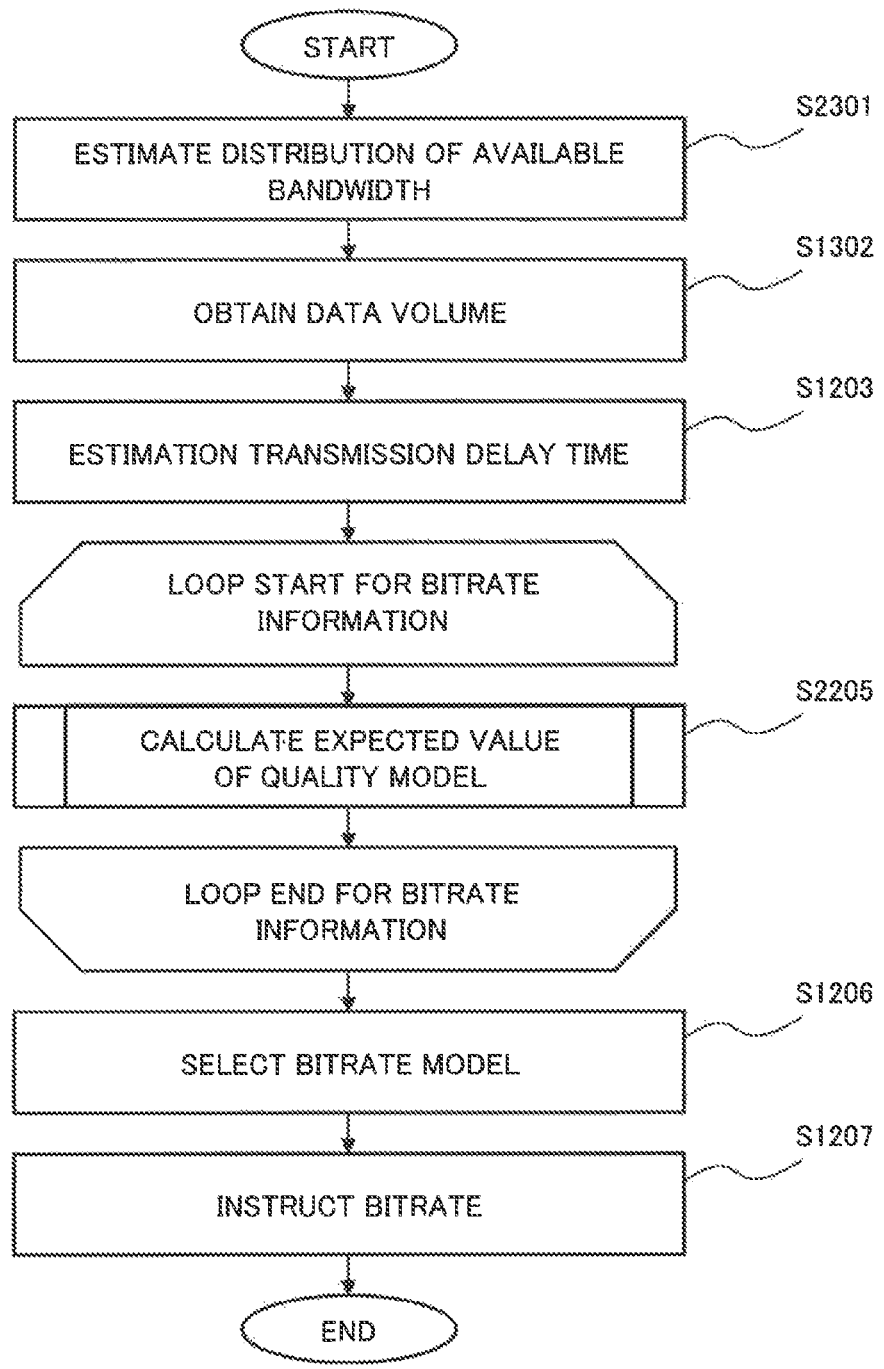
FIG. 11 is a flowchart illustrating a flow of processing in the streaming distribution device according to the second example embodiment.

Next, with reference to FIG. 11, processing in the streaming distribution device 1 according to the second example embodiment of the present invention will be described in detail. FIG. 11 is a flowchart illustrating a flow of processing in the streaming distribution device 1 according to the second example embodiment.

The available bandwidth unit 14 acquires a data volume transmitted per time by the transmission unit 13, predicts, for example, a distribution of a future available bandwidth based on the acquired value (step S2301), and generates bandwidth distribution information including the predicted distribution. The distribution is, for example, a probability distribution. In this case, the available bandwidth unit 14 may measure a data volume transmitted from the transmission unit 13, or may input a data volume from the transmission unit 13. Further, the buffer volume estimation unit 15 may acquire a data volume stored in the transmission buffer 131 from the transmission unit 13 (step S1302), and may set the acquired value as an estimation value of a buffer volume. Hereinafter, processing similar to step S1203, step S2205, step S1206, and step S1207 described above with reference to FIG. 4A is executed.

Next, an advantageous effect of the streaming distribution system 6 according to the second example embodiment of the present invention will be described.

The streaming distribution system 6 according to the second example embodiment can improve communication quality of information in a short period via a communication network. The reason is similar to the reason described above in the first example embodiment.

Third Example Embodiment

Next, a third example embodiment of the present invention, based on the first example embodiment described above, will be described.

In the following description, a characteristic portion according to the present example embodiment will be mainly described, and a component similar to a corresponding component of the first example embodiment described above is assigned with the same reference sign, and thereby overlapping description will be omitted.

Figure 12:
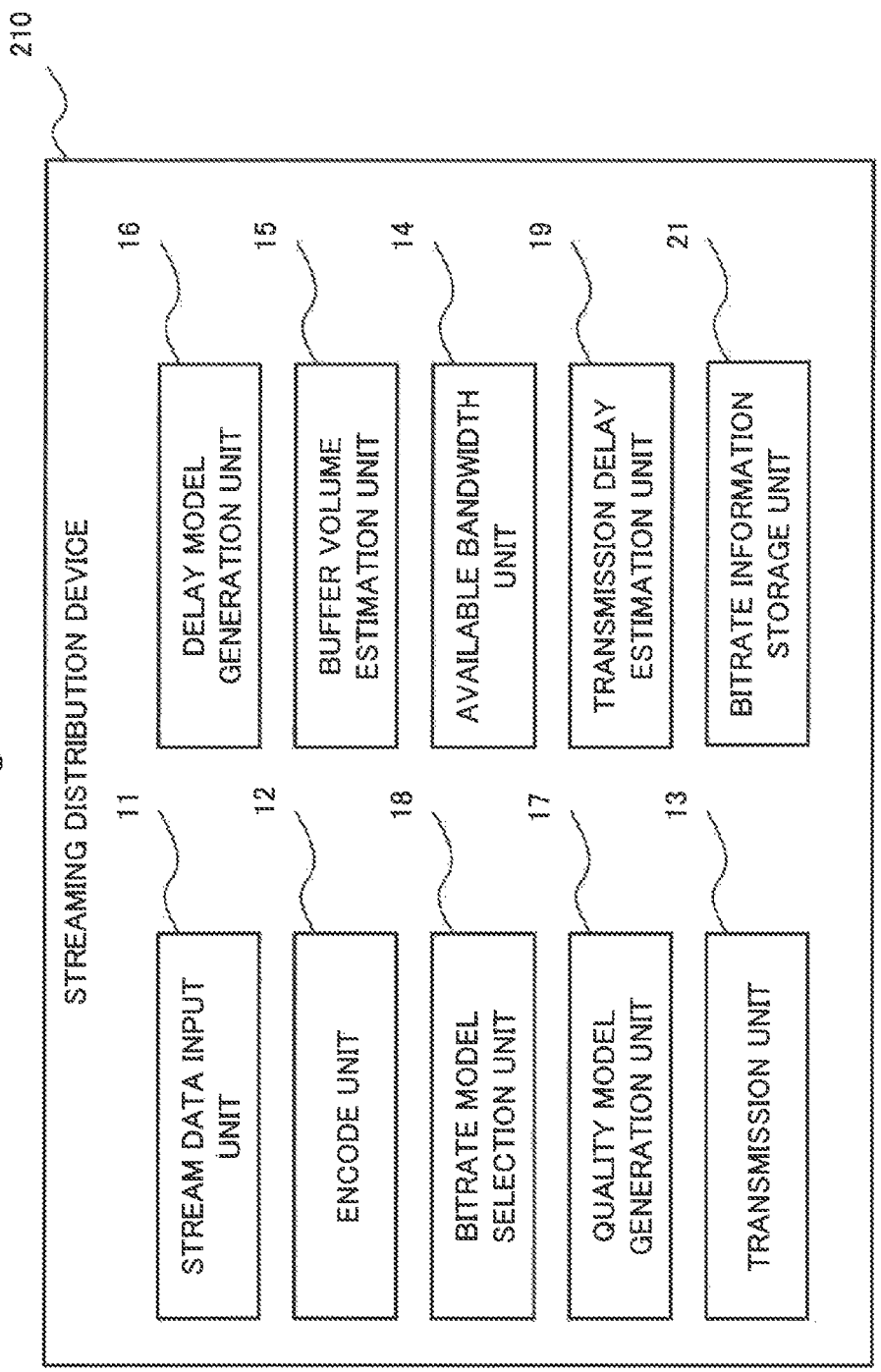
FIG. 12 is a block diagram illustrating a configuration of a streaming distribution device according to a third example embodiment of the present invention.

With reference to FIG. 12, a configuration of a streaming distribution device 210 according to the third example embodiment of the present invention will be described in detail. FIG. 12 is a block diagram illustrating a configuration of the streaming distribution device 210 according to the third example embodiment of the present invention.

The streaming distribution device 210 according to the third example embodiment of the present invention includes a stream data input unit 11, an encode unit (encoder) 12, a transmission unit (transmitter) 13, an available bandwidth unit 14, a buffer volume estimation unit (buffer volume estimator) 15, a delay model generation unit (delay model generator) 16, a quality model generation unit (quality model generator) 17, a bitrate model selection unit (bitrate model selector) 18, a transmission delay estimation unit (transmission delay estimator) 19, and a bitrate information storage unit 21.

When processing of determining a bitrate model is executed, for example, in a period of time equal to or less than one second, the streaming distribution device 210 needs to execute processing of selecting a bitrate model from bitrate information stored in the bitrate information storage unit 21, in a short period of time. In the present example embodiment, as one object of achieving processing in a short period of time, the number of bitrate models is small, compared with the example embodiments described above.

According to ITU-T G.1070 and the like, in streaming distribution, as a bitrate is higher and a delay time represented by a delay model $d(t)$ is shorter, high-quality distribution is achieved. In a delay model $d(t)$, a transmission delay time $dT(t)$ related to a communication network depends on a distance of a transmission path and the like in the communication network. Therefore, in streaming distribution, when a bitrate is equal to an available bandwidth, and in a delay model $d(t)$, a required time $dB(t)$ necessary for buffering is 0, high-quality distribution is made possible.

Figure 13:
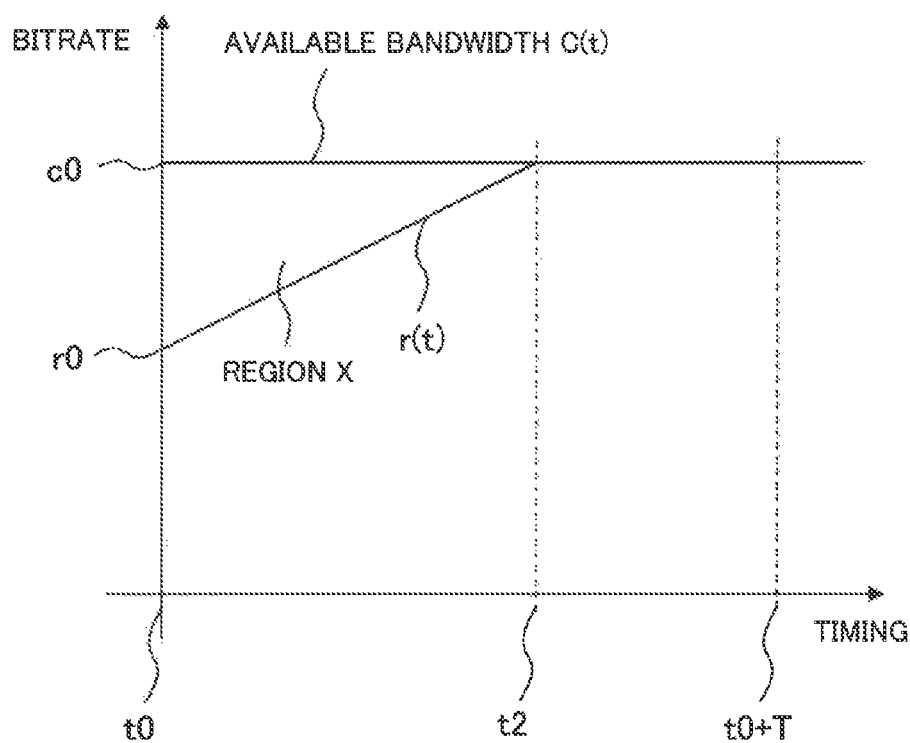
FIG. 13 is a diagram conceptually illustrating one example of a bitrate model.

In the present example embodiment, the bitrate information storage unit 21 includes, for example, a bitrate model $r(t)$ having a value that linearly increases (or decreases) from a certain bitrate to an available bandwidth and thereafter is the available bandwidth (substantially the available bandwidth), as exemplarily illustrated in FIG. 13. FIG. 13 is a diagram conceptually illustrating one example of a bitrate model. In FIG. 13, a horizontal axis represents a timing, and indicates that time passes more toward a right side. In FIG. 13, a vertical axis represents a bitrate, and indicates that a bitrate increases toward an upper side.

For convenience of description, it is assumed that at a timing t0, a value of a bitrate model $r(t)$ is r0. It is assumed that a value of an available bandwidth $C(t)$ is c0 after the timing t0. It is assumed that r0>0 and c0>0 are satisfied.

In the example illustrated in FIG. 13, it is assumed that a value of a bitrate model $r(t)$ increases by a2 (wherein, a2>0), when, for example, in a period from a timing t0 to a timing t2, a timing increases by 1. In the example illustrated in FIG. 13, after the timing t2, a value of the bitrate model $r(t)$ is a value c0 of an available bandwidth. In other words, the bitrate model $r(t)$ is a bitrate model represented in Eqn. A.

$$r(t) = a2 \times (t - t0) + r0 \ (t0 \leq t \leq t2), \quad \text{(Eqn. A)}$$
$$= c0 \ (t2 < t))$$

Therefore, a timing t2 is calculated in accordance with Eqn. 7. That is:

$$\text{timing } t2 = (c0 - r0) \div a2 + t0 \quad \text{(Eqn. 7)}$$

The bitrate information storage unit 21 stores a bitrate model in which at least one of r0 or a2 is different, with respect to a bitrate model as exemplarily illustrated in FIG. 13.

The bitrate model selection unit 18 selects, among bitrate models stored in the bitrate information storage unit 21, a bitrate model in which an expected value of a quality model in a period from a timing t0 to a timing "t0+T" is maximum (or substantially maximum).

As bitrate models stored in the bitrate information storage unit 21 increase (i.e. combinations of a2 and r0 increase), a possibility that the maximum value of a quality model is large is higher. In other words, as bitrate models stored in the bitrate information storage unit 21 increase, an advantageous effect that a probability, which acquired user quality is high, is higher is produced.

The number of bitrate models stored in the bitrate information storage unit 21 may be determined, based on an interval for selecting a bitrate model (i.e. a required time necessary for the selection processing). In this case, according to the streaming distribution device 210, even when a timing for selecting a bitrate model is already determined, a bitrate can be determined with high quality.

Further, the bitrate model selection unit 18 may select a bitrate model (i.e. a set of a2 and r0 in the present example embodiment) in such a way that, at a timing t2, a data volume stores in a buffer is 0 (or substantially 0). The substantially 0 may be a value near 0, and represents a numerical value, for example, in a range from 0 to (a buffer capacity×0.05). Specifically, a procedure of selecting, by the bitrate model selection unit 18, a bitrate model will be described.

When, for example, an available bandwidth C(t) is constant at c0 in a period from a timing t0 to a timing (t0+T), a data volume that decreases from a buffer in a period from the timing t0 to a timing t2 is represented by a difference (i.e. an area of a region X) between the available bandwidth C(t) and a bitrate model r(t). The bitrate model selection unit 18 calculates, for example, an area of the region X in accordance with Eqn. 8. That is:

$$\text{Area of region } X = (c0 - r0) \times (t2 - t0) \div 2 \qquad \text{(Eqn. 8)}_o$$

When a data volume stored in a buffer at a timing t0 is represented as B(t0), the bitrate model selection unit 18 selects a2 and r0 in which a condition that B(t0) and an area of a region X are equal to each other is satisfied. According to Eqn. 7 and Eqn. 8, a2 and r0 are relevant with each other. In other words, when any one of a2 and r0 is calculated, the other can be calculated, and therefore, the streaming distribution device 210 according to the third example embodiment can execute control achieving high performance of experience in a shorter period of calculation time.

The bitrate model selection unit 18 may select, in accordance with the above method, a bitrate model having a maximum expected value of a quality model among a plurality of bitrate models (exemplarily illustrated in FIG. 30) determined while c0 is changed. FIG. 30 is a diagram conceptually illustrating one example of a value calculated in processing of selecting a bitrate model. FIG. 30 is a figure similar to FIG. 29, and therefore description of FIG. 30 will be omitted.

In FIG. 30, a bitrate model 1 to a bitrate model 6 are exemplarily illustrated. The bitrate model 1 to the bitrate model 6 represent quality models determined when c0, as described with reference to FIG. 13 and the like, is set as 0.5, 1.5, 2.5, 3.5, 4.5, and 5.5 (Mbps), respectively. The bitrate model selection unit 18 executes processing, similar to processing described with reference to FIG. 29 and the like, for each bitrate model, and thereby determines an expected value of a quality model, and selects a bitrate model in which the determined expected value is maximum (the bitrate model 4 in the example of FIG. 30).

Next, an advantageous effect of the streaming distribution device 210 according to the third example embodiment of the present invention will be described.

The streaming distribution device 210 according to the third example embodiment can improve communication quality of information in a short period of time via a communication network. The reason is similar to the reason described above in the first example embodiment.

Further, the streaming distribution device 210 according to the present example embodiment can further improve communication quality of information in a short period of time. The reason is that the number of bitrate models stored in the bitrate information storage unit 21 is smaller than in the first example embodiment and the second example embodiment.

Further, the streaming distribution device 210 according to the third example embodiment can achieve communication having more excellent quality. The reason is that, according to a bitrate model included in bitrate information, by using a value that accords with (or is similar to) an available bandwidth model representing a band usable for a communication network after a timing t2, the streaming distribution device 210 can control communication. In other words, an available bandwidth model represents a change (relation) degree of a communication bandwidth of the communication network 3 with a passage of time.

Further, according to the streaming distribution device 210 according to the third example embodiment can improve communication quality of information in a shorter period of time. The reason is that a bitrate model is configured by a polygonal line, and therefore the streaming distribution device 210 can calculate a parameter including in the bitrate model with small calculation amount.

In the present example embodiment, while the bitrate information storage unit 21 stores a bitrate model, the streaming distribution device 210 according to the third example embodiment may include a parameter calculation unit that calculates a bitrate model according to equations and the like described above.

Fourth Example Embodiment

Next, a fourth example embodiment of the present invention, based on the first example embodiment described above, will be described.

In the following description, a characteristic portion according to the present example embodiment will be mainly described, and a component similar to a corresponding component of the first example embodiment described above is assigned with the same reference sign, and thereby overlapping description will be omitted.

Figure 14:
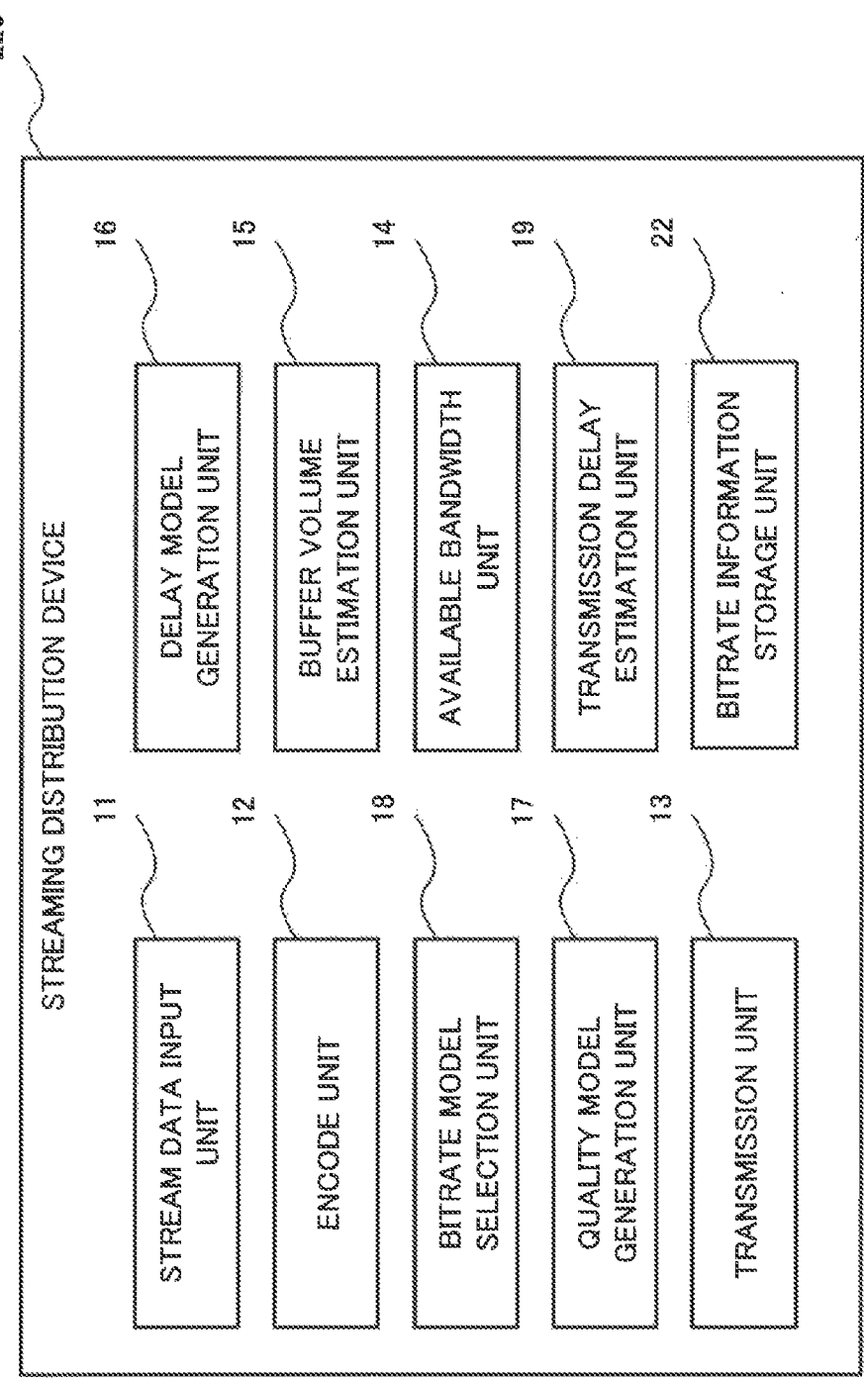
FIG. 14 is a block diagram illustrating a configuration of a streaming distribution device according to a fourth example embodiment of the present invention.

With reference to FIG. 14, a configuration of a streaming distribution device 220 according to the fourth example embodiment of the present invention will be described in detail. FIG. 14 is a block diagram illustrating a configuration of the streaming distribution device 220 according to the fourth example embodiment of the present invention.

The streaming distribution device 220 according to the fourth example embodiment of the present invention includes a stream data input unit 11, an encode unit (encoder) 12, a transmission unit (transmitter) 13, an available bandwidth unit 14, a buffer volume estimation unit (buffer volume estimator) 15, a delay model generation unit (delay model generator) 16, a quality model generation unit (quality model generator) 17, a bitrate model selection unit (bitrate model selector) 18, a transmission delay estimation unit (transmission delay estimator) 19, and a bitrate information storage unit 22.

Figure 15:
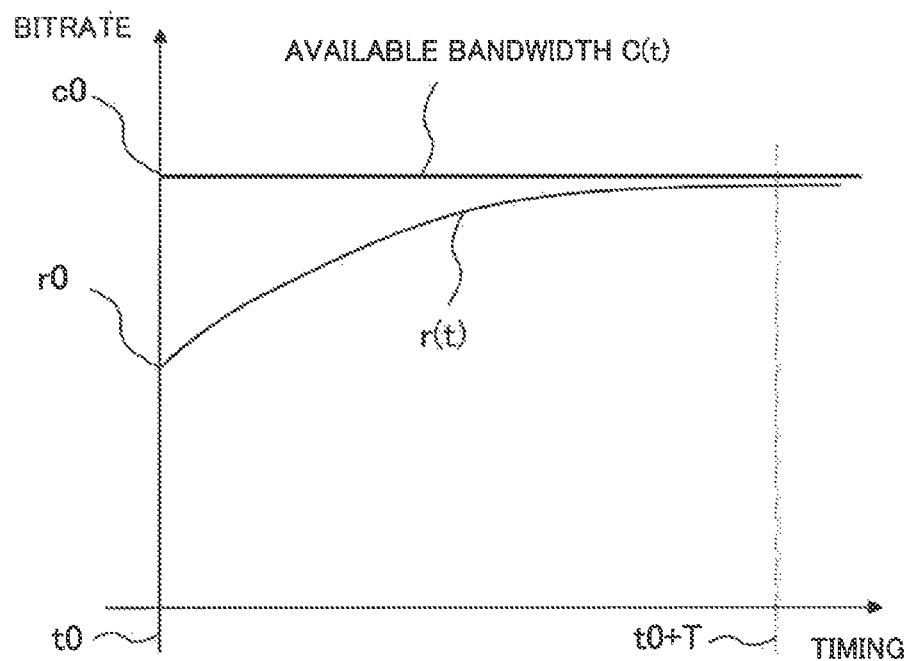
FIG. 15 is a diagram conceptually illustrating one example of a bitrate model.

In the present example embodiment, the bitrate information storage unit 22 stores a bitrate model that is an exponential function in which, as exemplarily illustrated in FIG. 15, at a timing t0, a value of a bitrate model is r0 and is converged to an available bandwidth C(t) with a passage of time. FIG. 15 is a diagram conceptually illustrating one example of a bitrate model. In FIG. 15, a horizontal axis represents a timing, and indicates that time passes more toward a right side. In FIG. 15, a vertical axis represents a bitrate, and indicates that a bitrate increases toward an upper side.

Specifically, the bitrate information storage unit 22 stores a bitrate model exemplarily represented in Eqn. 9. That is:

$$r(t)=(r0-c0)\times \exp(b\times(t-t0))+c0 \quad \text{(Eqn. 9)},$$

wherein b<0 and 0<r≤c0 are satisfied. A term exp(x) represents an exponential function with respect to a Napier's constant e (similar in the following equations).

The bitrate information storage unit 22 stores a bitrate model different in b from a bitrate model, for example, with respect to a bitrate model as exemplarily illustrated in FIG. 15.

The bitrate model selection unit 18 calculates, among bitrate models stores in the bitrate information storage unit 22, bitrate models optimum for each c0, similarly to processing described with reference to FIG. 30 and the like. The bitrate model selection unit 18 selects, among the optimum bitrate models calculated for each c0, a bitrate model in which an expected value of a quality model in a period from a timing t0 to a timing "t0+T" is maximum (or substantially maximum).

Next, an advantageous effect of the streaming distribution device 220 according to the fourth example embodiment of the present invention will be described.

In the present example embodiment, similarly to the third example embodiment, bitrate models stored in the bitrate information storage unit 22 are few, and therefore an advantageous effect that a required time necessary for processing of selecting a bitrate model is short is produced.

It has been described that in the third example embodiment, a bitrate model is represented by using a straight line, and in the fourth example embodiment, a bitrate model is represented by using an exponential function, without limitation to these examples described above. A bitrate model may be a function defined by a timing t and one or more parameters. Further, the bitrate information storage unit 22 may store bitrate information including a plurality of types of bitrate models, as in a set including a straight line and an exponential function.

Next, an advantageous effect of the streaming distribution device 220 according to the fourth example embodiment of the present invention will be described.

The streaming distribution device 220 according to the fourth example embodiment can improve communication quality of information in a short period of time via a communication network. The reason is similar to the reason described above in the first example embodiment.

While, in the present example embodiment, it is assumed that the bitrate information storage unit 22 stores a bitrate model, the streaming distribution device 220 according to the fourth example embodiment may include a parameter calculation unit that calculates a bitrate model in accordance with equations and the like described above.

Fifth Example Embodiment

Next, a fifth example embodiment of the present invention, based on the first example embodiment described above, will be described.

In the following description, a characteristic portion according to the present example embodiment will be mainly described, and a component similar to a corresponding component of the first example embodiment described above is assigned with the same reference sign, and thereby overlapping description will be omitted.

Figure 16:
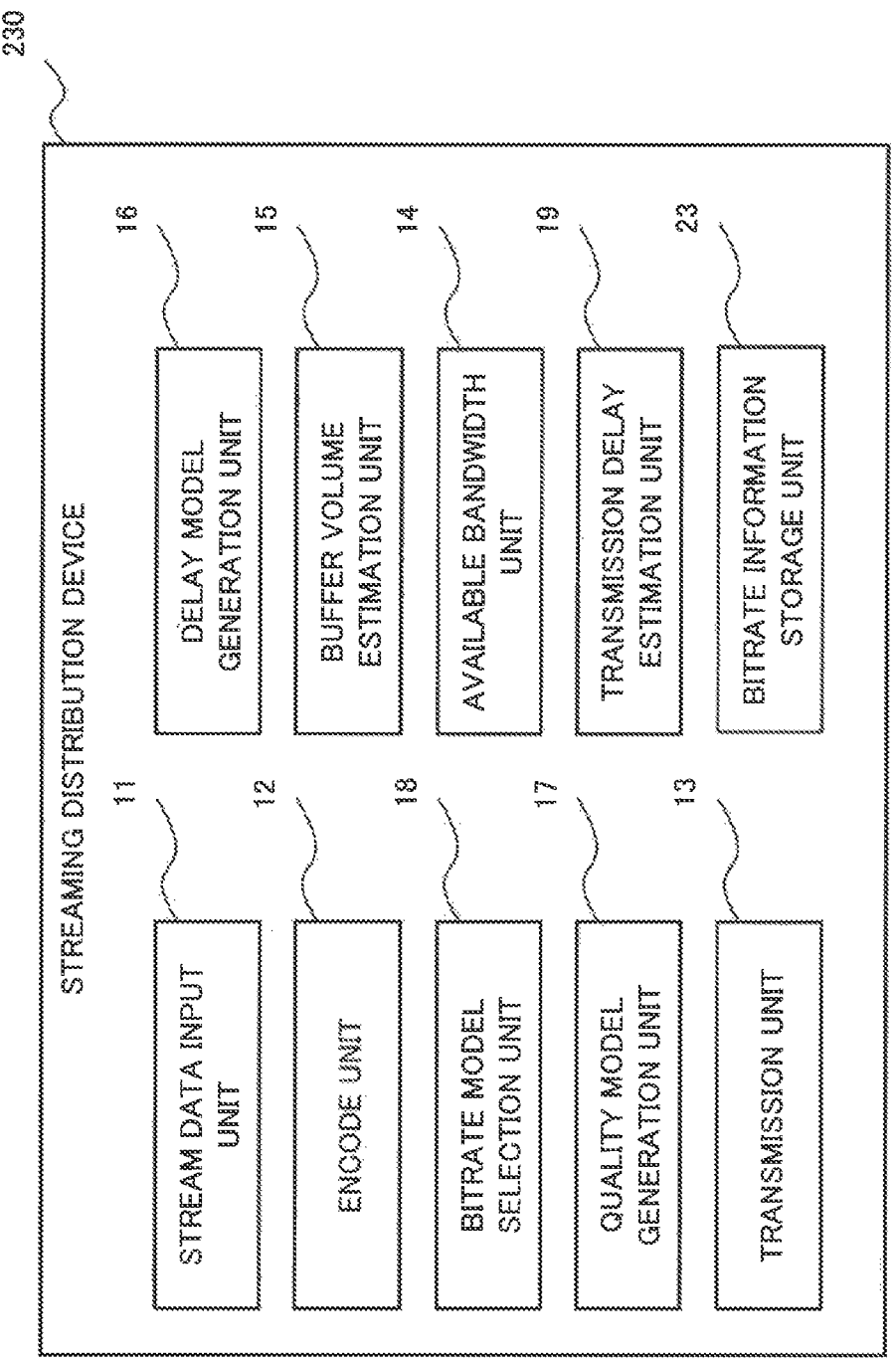
FIG. 16 is a block diagram illustrating a configuration of a streaming distribution device according to a fifth example embodiment of the present invention.

With reference to FIG. 16, a configuration of a streaming distribution device 230 according to the fifth example embodiment of the present invention will be described in detail. FIG. 16 is a block diagram illustrating a configuration of the streaming distribution device 230 according to the fifth example embodiment of the present invention.

The streaming distribution device 230 according to the fifth example embodiment of the present invention includes a stream data input unit 11, an encode unit (encoder) 12, a transmission unit (transmitter) 13, an available bandwidth unit 14, a buffer volume estimation unit (buffer volume estimator) 15, a delay model generation unit (delay model generator) 16, a quality model generation unit (quality model generator) 17, a bitrate model selection unit (bitrate model selector) 18, a transmission delay estimation unit (transmission delay estimator) 19, and a bitrate information storage unit 23.

Figure 17:
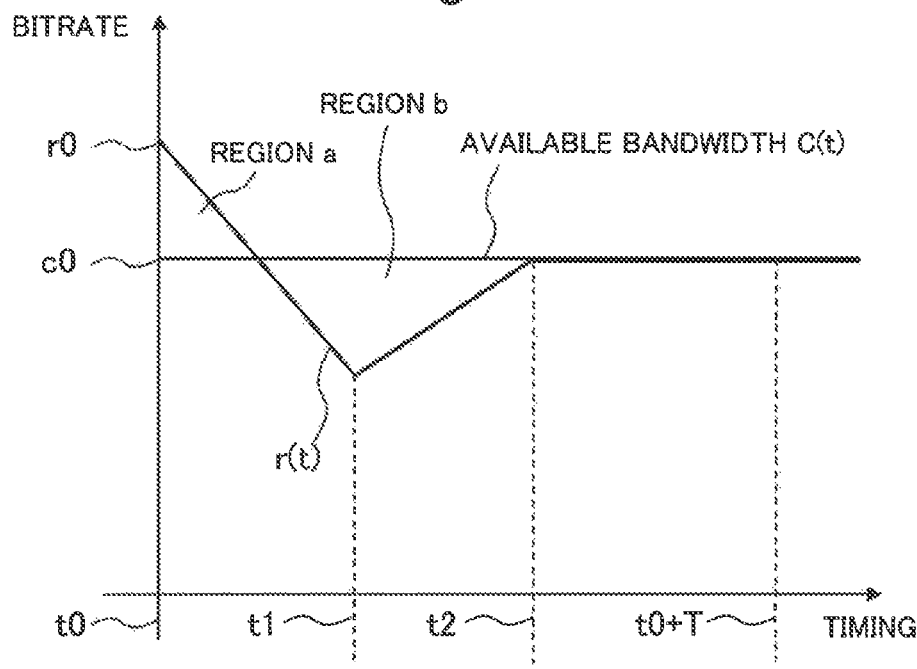
FIG. 17 is a diagram conceptually illustrating one example of a bitrate model.
Figure 18:
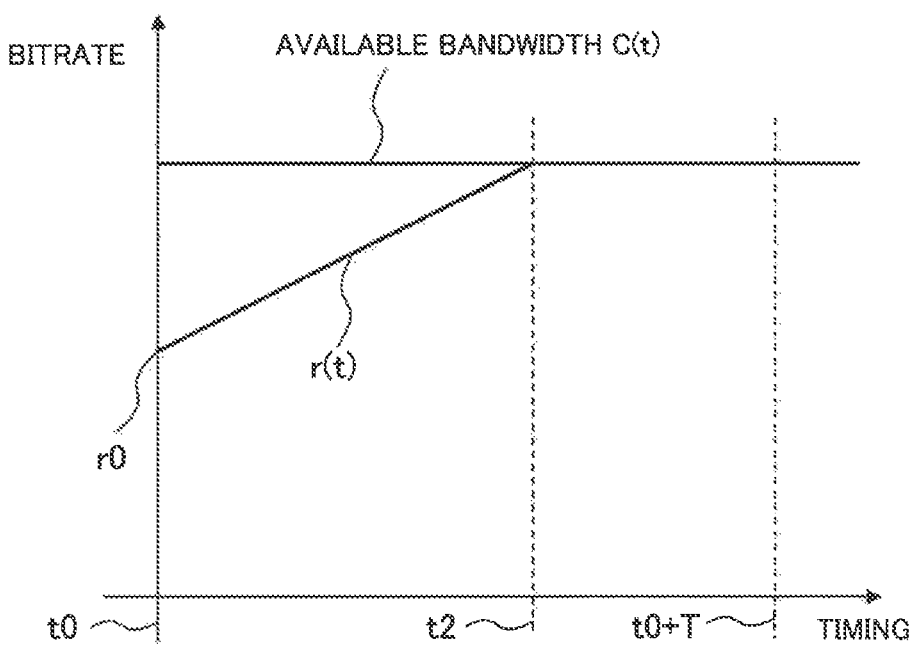
FIG. 18 is a diagram conceptually illustrating one example of a bitrate model.
Figure 19:
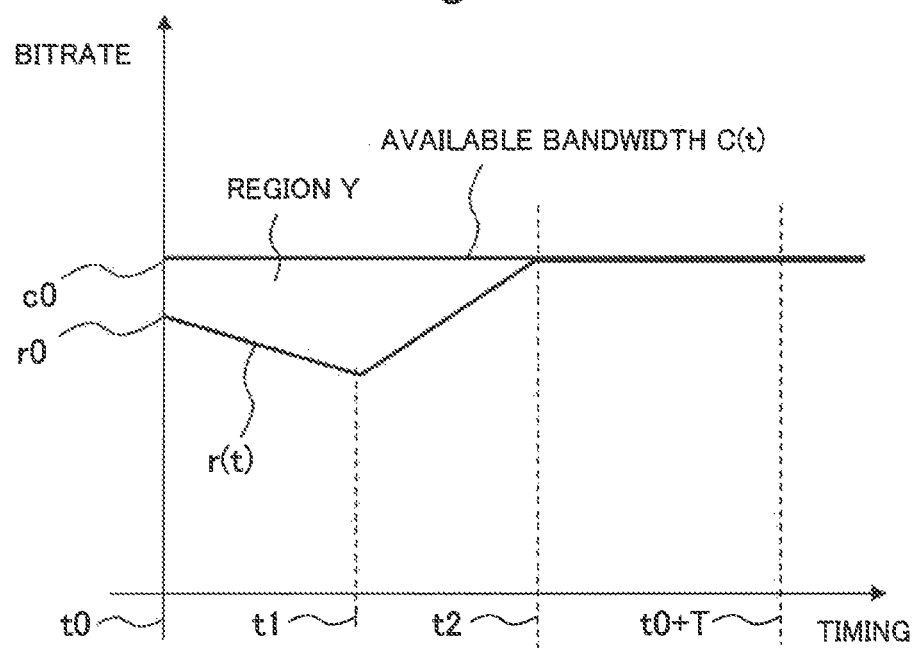
FIG. 19 is a diagram conceptually illustrating one example of a bitrate model.

In the present example embodiment, the bitrate information storage unit 23 stores a bitrate model that is a value r0 determined based on a bitrate immediately before a timing t0 (e.g. the same value as or a value similar to a value of a bitrate immediately before the timing t0), for example, as exemplarily illustrated in FIG. 17 to FIG. 19. FIG. 17 to FIG. 19 each are a diagram conceptually illustrating one example of a bitrate model. In FIG. 17 to FIG. 19, a horizontal axis represents a timing, and indicates that time passes more toward a right side. In FIG. 17 to FIG. 19, a vertical axis represents a bitrate, and indicates that a bitrate increases toward an upper side.

Specifically, with reference to FIG. 17 to FIG. 19, a bitrate model exemplarily illustrated in each figure will be described. For convenience of description, in the examples illustrated in FIG. 17 to FIG. 19, it is assumed that an available bandwidth C(t) is constant in an available bandwidth c0 at a timing t0.

The bitrate information storage unit 23 stores a bitrate model (exemplarily illustrated in FIG. 17) represented in Eqn. 10.

That is:

$$r(t)=a1\times(t-t0)+r0(t0 \le t \le t1),$$

$$a2\times(t-t1)+a1\times(t1-t0)+r0(t1 < t \le t2),$$

$$C(t)(t2<t) \quad \text{(Eqn. 10)}.$$

For convenience of description, a bitrate at a timing t0 is represented as r0. It is assumed that the bitrate model is r0 at the timing t0 and decreases with a slope a1 (wherein, a1<0) in a period from the timing t0 to a timing t1. It is assumed that the bitrate model increases with a slope a2 (wherein, a2>0) in a period from the timing t1 to a timing t2. After the timing t2, the bitrate model is a value representing an available bandwidth c0 (or substantially an available bandwidth c0).

The bitrate information storage unit 23 stores a bitrate model different in at least any one of a1, a2, or t1 (t0≤t1≤t0+T), with respect to a bitrate model, for example, as exemplarily illustrated in FIG. 17.

The bitrate model selection unit 18 selects, among bitrate models stored in the bitrate information storage unit 23, a plurality of bitrate models for each c0 in which a quality model in a period from a timing t0 to a timing "t0+T" is maximum (or substantially maximum), similarly to the processing described above in the third example embodiment or the fourth example embodiment. The bitrate model selection unit 18 selects, among the plurality of selected bitrate models, a bitrate model in which an expected value (average value) of a quality model for the bitrate model is maximum (or substantially maximum).

As bitrate models stored in the bitrate information storage unit 23 increase (i.e. combinations of a1, a2, and t1 increase), a possibility that the maximum value of a quality model is large is higher. In other words, as bitrate models stored in the bitrate information storage unit 23 increase, an advantageous effect that a possibility, which acquired user quality is high, is higher is produced.

The number of bitrate models stored in the bitrate information storage unit 23 may be determined, based on a time necessary for selecting a bitrate model (i.e. a required time necessary for selection processing). In this case, according to the streaming distribution device 230, even when a timing for selecting a bitrate model is already determined, a bitrate can be determined with high quality.

Further, the bitrate model selection unit 18 may select a bitrate model (i.e. a set of a1, a2, and t1 in the present example embodiment) in such a way that a data volume stored in a buffer at a timing t2 is 0 (or substantially 0). Specifically, a procedure of selecting, by the bitrate model selection unit 18, a bitrate model will be described.

When a bitrate represented by a bitrate model r(t) is larger than an available bandwidth (i.e. r(t)>C(t)), a data volume (i.e. a buffer volume B(t)) stored in a buffer increases, and when a bitrate represented by a bitrate model r(t) is smaller than an available bandwidth (i.e. r(t)<C(t)), a data volume stored in a buffer decreases. Referring to FIG. 17, a data volume in which a bitrate represented by a bitrate model r(t) exceeds an available bandwidth represents an area of a region a. A data volume in which a bitrate represented by a bitrate model r(t) is smaller than the available bandwidth represents an area of a region b. Therefore, the bitrate model selection unit 18 calculates any two values of a1, a2, and t1. Thereafter, the bitrate model selection unit 18 calculates a remaining one value, in accordance with a conditional equation that a sum of a data volume having been stored in a buffer at a timing t0 (i.e. a buffer volume B(t0)) and a data volume stored in the buffer (i.e. the area of the region a) is equal to a volume eliminated from the buffer (i.e. the area of the region b). In this case, the bitrate model selection unit 18 calculates a remaining one value in accordance with a conditional equation "B(t0)+(an area of a region a)=(an area of a region b)".

Next, with reference to FIG. 18, a bitrate model stored in the bitrate information storage unit 23 will be described. The bitrate information storage unit 23 stores a bitrate model (exemplarily illustrated in FIG. 18) represented in Eqn. A described above. However, a bitrate r0 at a timing t0 is a value calculated based on a bitrate immediately before the timing t0 (e.g. the same value as or a value similar to a bitrate immediately before the timing t0).

Description of Eqn. A is similar to the above description, and therefore the description will be omitted in the present example embodiment.

Next, with reference to FIG. 19, a bitrate model stored in the bitrate information storage unit 23 will be described. The bitrate information storage unit 23 stores a bitrate model (exemplarily illustrated in FIG. 19) represented in Eqn. 11. That is:

$$r(t)=a1\times(t-t0)+r0 \quad (t0\leq t\leq t1),$$

$$a2\times(t-t1)+a1\times(t1-t0)+r0 \quad (t1<t\leq t2),$$

$$C(t) \quad (t2<t) \qquad \text{(Eqn. 11)}.$$

For convenience of description, a bitrate at a timing t0 is represented as r0. It is assumed that the bitrate model is r0 at the timing t0 and decreases with a slope a1 (wherein, a1<0) in a period from the timing t0 to a timing t1. It is assumed that the bitrate model increases with a slope a2 (wherein, a2>0) in a period from the timing t1 to a timing t2. After the timing t2, the bitrate model is a value that is an available bandwidth c0 (or substantially an available bandwidth c0). However, a bitrate model r(t) is a value smaller than an available bandwidth C(t) (i.e. r(t)<C(t)) in a period from the timing t0 to a timing (t0+T). A substantially available bandwidth c0 represents a value in a range where, for example, an error from the available bandwidth c0 is approximately equal to or less than 5%.

The bitrate information storage unit 23 stores a bitrate model different in at least any one of a1, a2, or t1 (t0≤t1≤t0+T), with respect to a bitrate model, for example, as exemplarily illustrated in FIG. 19.

The bitrate model selection unit 18 selects, among bitrate models stored in the bitrate information storage unit 23, a plurality of bitrate models for each c0 in which a quality model in a period from a timing t0 to a timing "t0+T" is maximum (or substantially maximum), similarly to the processing described above in the third example embodiment or the fourth example embodiment. The bitrate model selection unit 18 selects, among the plurality of selected bitrate models, a bitrate model in which an expected value of a quality model is maximum (or substantially maximum).

As bitrate models stored in the bitrate information storage unit 23 increase (i.e. combinations of a1, a2, and t1 increase), a possibility that the maximum value of a quality model is large is higher. In other words, as bitrate models stored in the bitrate information storage unit 23 increase, an advantageous effect that a possibility, which acquired quality is high, is higher is produced.

The number of bitrate models stored in the bitrate information storage unit 23 may be determined, based on a required time necessary for selecting a bitrate model (i.e. a required time necessary for selection processing). In this case, according to the streaming distribution device 230, even when a required time for selecting a bitrate model is already determined, a bitrate can be determined with high quality.

Further, the bitrate model selection unit 18 may select a bitrate model (i.e. a set of a1, a2, and t1 in the present example embodiment) in such a way that a data volume stored in a buffer at a timing t2 is 0 (or substantially 0). Specifically, a procedure of selecting, by the bitrate model selection unit 18, a bitrate model will be described.

In the example illustrated in FIG. 19, a bitrate model r(t) is smaller than available bandwidth C(t) in a period from a timing t0 to a timing t2, and therefore a data volume stored in a buffer decreases in the period. The bitrate model selection unit 18 calculates any two values of a1, a2, and t1. Thereafter, the bitrate model selection unit 18 calculates a remaining one value, in accordance with a conditional equation that a data volume stored in a buffer at a timing t0 (i.e. a buffer volume B(t0)) and an amount eliminated from the buffer (i.e. an area of a region Y) are equal to each other. In this case, the bitrate model selection unit calculates a remaining one value in accordance with a conditional equation "B(t0)=(an area of a region Y)".

Further, the bitrate information storage unit 23 may store a bitrate model, with respect to a case where a data volume (i.e. a buffer volume B(t0)) stored in a buffer is a value larger than a predetermined value. In such a bitrate model, when a bitrate model is further decreased temporarily from an available bandwidth and then is increased up to the available bandwidth, an improvement degree of quality of experience is further increased. Therefore, the streaming distribution device 230 according to the present example embodiment alleviates a rapid change of a bitrate, and thereby an advantageous effect that a possibility, which quality of experience is improved, is high is produced.

While, in the fifth example embodiment, as an example of a bitrate model, a model in which a straight line is continuously connected (i.e. a model represented by a polygonal line) is exemplarily illustrated, a bitrate model is not limited the example described above. A bitrate model may be a function with respect to a timing.

Next, an advantageous effect of the streaming distribution device 230 according to the fifth example embodiment of the present invention will be described.

The streaming distribution device 230 according to the fifth example embodiment can improve communication quality of information in a short period of time via a communication network. The reason is similar to the reason described above in the first example embodiment.

Further, the streaming distribution device 230 according to the fifth example embodiment can achieve higher-quality communication of information in a short period of time. The reason is that a possibility that, at a timing t0, quality is poor is reduced. The streaming distribution device 230 sets, for example, a bitrate r0 at a timing t0 as the same value as (or a value similar to) a bitrate immediately before the timing t0, and thereby reduces a possibility that, at the timing t0, quality is poor.

While, in the present example embodiment, it is assumed that the bitrate information storage unit 23 stores a bitrate model, the streaming distribution device 230 according to the fifth example embodiment may include a parameter calculation unit that calculates a bitrate model in accordance with equations and the like described above.

Sixth Example Embodiment

Next, a sixth example embodiment of the present invention, based on the first example embodiment described above, will be described.

In the following description, a characteristic portion according to the present example embodiment will be mainly described, and a component similar to a corresponding component of the first example embodiment described above is assigned with the same reference sign, and thereby overlapping description will be omitted.

Figure 20:
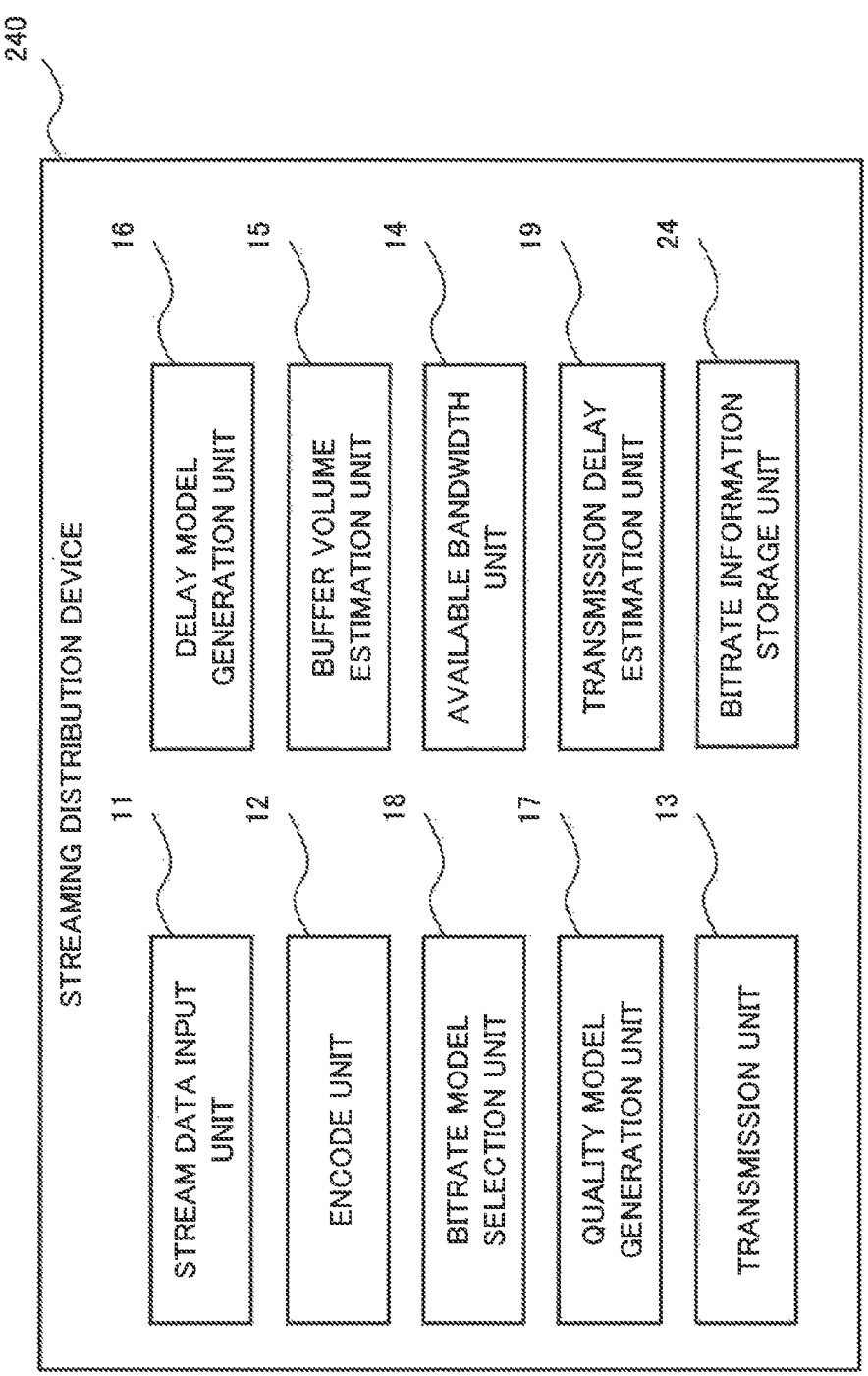
FIG. 20 is a block diagram illustrating a configuration of a streaming distribution device according to a sixth example embodiment of the present invention.

With reference to FIG. 20, a configuration of a streaming distribution device 240 according to the sixth example embodiment of the present invention will be described in detail. FIG. 20 is a block diagram illustrating a configuration of the streaming distribution device 240 according to the sixth example embodiment of the present invention.

The streaming distribution device 240 according to the sixth example embodiment of the present invention includes a stream data input unit 11, an encode unit (encoder) 12, a transmission unit (transmitter) 13, an available bandwidth unit 14, a buffer volume estimation unit (buffer volume estimator) 15, a delay model generation unit (delay model generator) 16, a quality model generation unit (quality model generator) 17, a bitrate model selection unit (bitrate model selector) 18, a transmission delay estimation unit (transmission delay estimator) 19, and a bitrate information storage unit 24.

Figure 21:
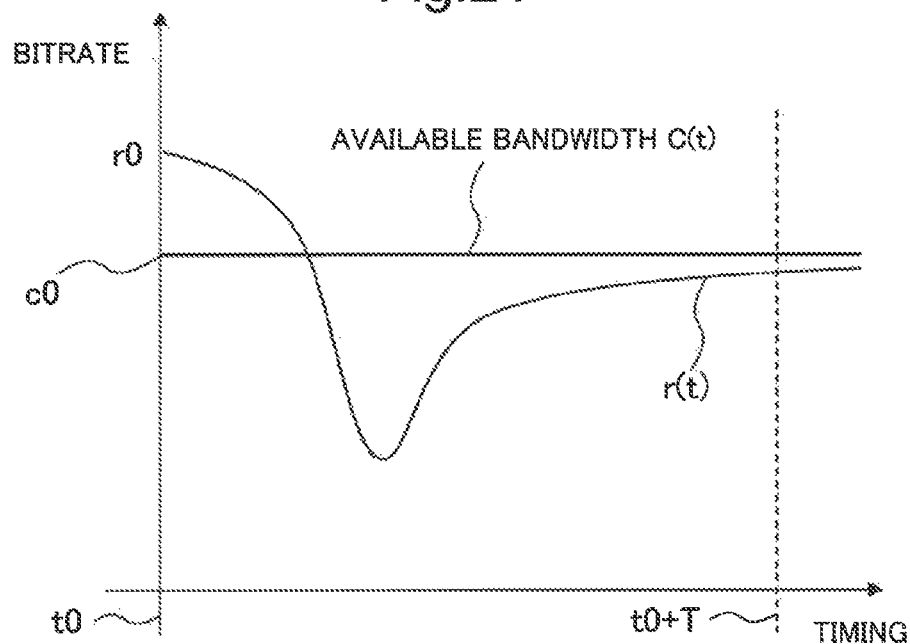
FIG. 21 is a diagram conceptually illustrating one example of a bitrate model.

In the present example embodiment, the bitrate information storage unit 24 stores a bitrate model (exemplarily illustrated in FIG. 21) calculated based on two exponential functions, for example, as represented in Eqn. 12 to be described later. FIG. 21 is a diagram conceptually illustrating one example of a bitrate model. In FIG. 21, a horizontal axis represents a timing, and indicates that time passes more toward a right side. In FIG. 21, a vertical axis represents a bitrate, and indicates that a bitrate increases toward an upper side.

Specifically, with reference to FIG. 21, a bitrate model will be described. For convenience of description, in the case of the example illustrated in FIG. 21, it is assumed that an available bandwidth C(t) is constant in an available bandwidth c0 at a timing t0.

The bitrate information storage unit 24 stores a bitrate model (exemplarily illustrated in FIG. 21) represented in Eqn. 12. That is:

$$r(t)=a1\times\exp(b1\times(t-t0))+c0+a2\times\exp(d\times b2\times(t-t0)) \quad \text{(Eqn. 12)},$$

$$a1<0, a2\geq 0, b1<0, b2<0, d>1, a1+a2+c0=r0.$$

In the bitrate model r(t) represented in Eqn. 12, "a1×exp(b1×(t−t0))+c0" is an exponential function converged to c0, similarly to the fourth example embodiment, when a timing t has a sufficiently large value. In other words, when a2 is 0, Eqn. 12 represents an equation equivalent to Eqn. 9 described in the fourth example embodiment. Further, "a2×exp(d×b2×(t−t0))" with the bitrate model r(t) represented in Eqn. 12 is an exponential function converged to 0, when a timing t has a sufficiently large value. Further, "a2×exp(d×b2×(t−t0))" is rapidly converged, compared with "a1×exp(b1×(t−t0))+c0", when d×b2<b1 is satisfied. Therefore, the bitrate model represented in Eqn. 12 is a function in which a value of the bitrate model is decreased once and then converged to an available bandwidth c0 with a passage of time, as exemplarily illustrated in FIG. 21.

The bitrate information storage unit 24 stores a bitrate model different in at least any one of a1, a2, b1, b2, or d, with respect to a bitrate model, for example, as exemplarily illustrated in FIG. 21.

The bitrate model selection unit 18 selects, among bitrate models stored in the bitrate information storage unit 24, a plurality of bitrate models for each c0 in which a quality model in a period from a timing t0 to a timing "t0+T" is maximum (or substantially maximum), similarly to the processing described above in the third example embodiment to the fifth example embodiment. The bitrate model selection unit 18 further selects, among the plurality of selected bitrate models, a bitrate model in which an expected value of a quality model is maximum (or substantially maximum), in accordance with processing as described with reference to FIG. 29 and the like.

As bitrate models stored in the bitrate information storage unit 24 increase (i.e. combinations of a1, a2, b1, b2, and d increase), a possibility that the maximum value of a quality model is large is higher. In other words, as bitrate models stored in the bitrate information storage unit 24 increase, an advantageous effect that a possibility, which acquired quality is high, is higher is produced.

The number of bitrate models stored in the bitrate information storage unit 24 may be determined, based on a time necessary for selecting a bitrate model (i.e. a required time necessary for selection processing). In this case, according to the streaming distribution device 240, even when a timing for selecting a bitrate model is already determined, a bitrate can be determined with high quality.

While, in the sixth example embodiment, as an example of a bitrate model, a model described by using an exponential function is exemplarily described, a bitrate model is not limited to the example described above. A bitrate model may be a function with respect to timing.

Next, an advantageous effect of the streaming distribution device 240 according to the sixth example embodiment will be described.

The streaming distribution device 240 according to the sixth example embodiment can improve communication quality of information in a short period of time via a communication network. The reason is similar to the reason described above in the first example embodiment.

Further, the streaming distribution device 240 according to the sixth example embodiment can improve higher-quality communication quality of information in a short period of time. The reason is that a bitrate model stored in the bitrate information storage unit 24 is set as a sum of exponential functions, and therefore a possibility that a bitrate model rapidly changes is low. As a result, according to the streaming distribution device 240 according to the sixth example embodiment, a possibility that quality degrades is low, and therefore higher-quality communication of information can be achieved in a short period of time.

While, in the present example embodiment, it is assumed that the bitrate information storage unit 24 stores a bitrate model, the streaming distribution device 240 according to the sixth example embodiment may include a parameter calculation unit that calculates a bitrate model, in accordance with equations and the like described above.

Seventh Example Embodiment

Next, a seventh example embodiment of the present invention will be described.

In the following description, a characteristic portion according to the present example embodiment will be mainly described, and a component similar to a corresponding component of each example embodiment described above is assigned with the same reference sign, and thereby overlapping description will be omitted.

Figure 22:
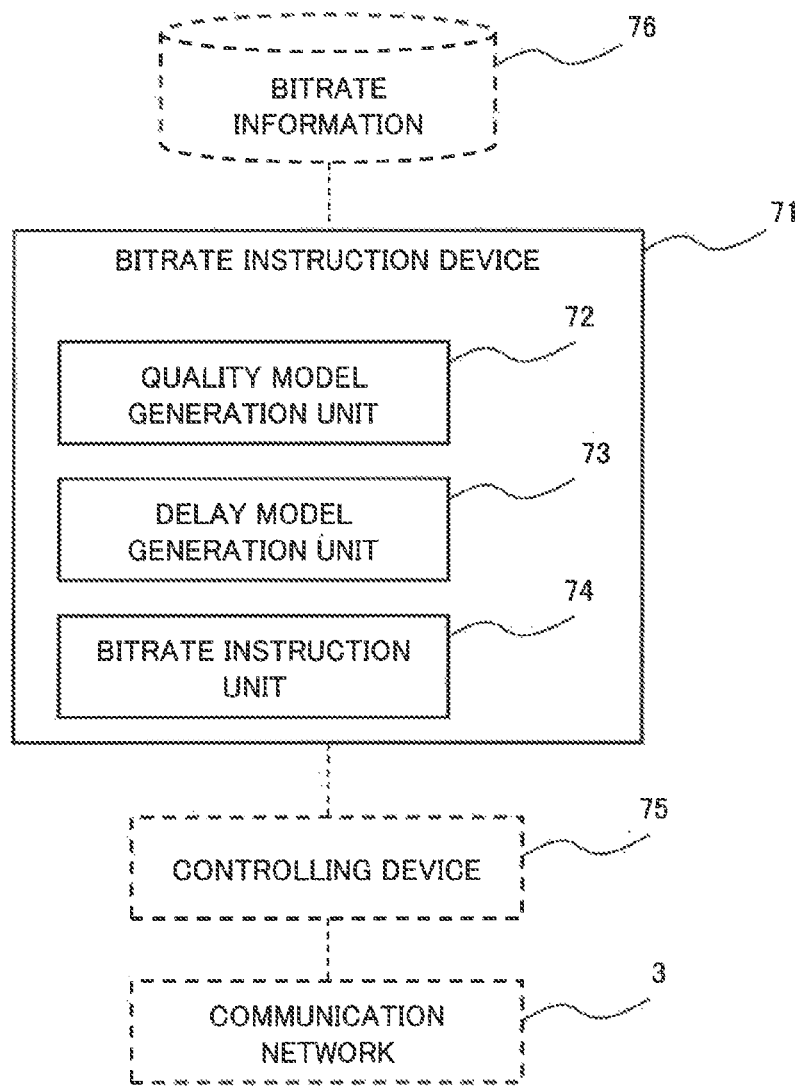
FIG. 22 is a block diagram illustrating a configuration of a bitrate instruction device according to a seventh example embodiment of the present invention.

With reference to FIG. 22, a configuration of a bitrate instruction device 71 according to the seventh example embodiment of the present invention will be described in detail. FIG. 22 is a block diagram illustrating a configuration of the bitrate instruction device 71 according to the seventh example embodiment of the present invention.

The bitrate instruction device 71 according to the seventh example embodiment of the present invention includes a quality model generation unit (quality model generator) 72, a delay model generation unit (delay model generator) 73, and a bitrate instruction unit (bitrate instructor) 74.

The bitrate instruction device 71 can be connected (or communicably connected) to a controlling device 75 that controls a communication network 3. The bitrate instruction device 71 can refer to bitrate information 76 including a plurality of bitrate models as described with reference to FIG. 5, FIG. 13, FIG. 15, FIG. 17 to FIG. 19, FIG. 21, or the like. In other words, the bitrate instruction device 71 can refer to bitrate information 76 including a plurality of bitrate models representing a change degree of data volume per time of data communicated via the communication network 3 with a passage of time.

The delay model generation unit 73 generates a delay model capable of determining a time delayed, when data are communicated via the communication network 3, based on a difference between a bitrate model included in bitrate information 76 and an available bandwidth model as described above. In other words, the delay model generation unit 73 generates the delay model, based on a difference between a bitrate model included in the bitrate information 76 and an available bandwidth model representing a change degree of a communication bandwidth of the communication network 3 with a passage of time. The delay model generation unit 73 generates a delay model with respect to the bitrate model and the available bandwidth function, for example, in accordance with Eqn. 1 to Eqn. 5. The delay model represents a change degree of a delay time of communication via the communication network 3 with a passage of time.

The quality model generation unit 72 calculates, for example, in accordance with the method disclosed in PTL 1, a quality model capable of determining communication quality, when a delay occurs according to a delay model generated by the delay model generation unit 73 and further a bitrate is controlled in accordance with the bitrate model. In this case, the quality model generation unit 72 generates the quality model by using the delay model generated by the delay model generation unit 73 and the bitrate model.

The quality model generation unit 72 and the delay model generation unit 73 execute the processing described above, for example, for each bitrate model included in the bitrate information 76.

The bitrate instruction unit 74 selects, among bitrate models included in the bitrate information 76, a bitrate model in which an expected value of a quality model generated by the quality model generation unit 72 for the bitrate model is large. In other words, the bitrate instruction unit 74 selects, among bitrate models included in the bitrate information 76, a bitrate model in which quality determined in accordance with a quality model is large with respect to a certain period. The bitrate instruction unit 74 transmits, to the controlling device 75 that controls the communication network 3, request information for requesting a communication speed to be controlled in accordance with the selected bitrate model.

The controlling device 75 receives the request information transmitted by the bitrate instruction unit 74, and controls communication in the communication network 3, in accordance with a bitrate model instructed by the received request information.

The delay model generation unit 73 can be achieved, for example, by using a function included in the delay model generation unit 16 illustrated in FIG. 2. The quality model generation unit 72 can be achieved, for example, by using a function included in the quality model generation unit 17 illustrated in FIG. 2. The bitrate instruction unit 74 can be achieved, for example, by using a function included in the bitrate model selection unit 18 and a function included in the transmission unit 13 illustrated in FIG. 2. In summary, the bitrate instruction device 71 can be achieved by using a function included in the streaming distribution device 1 illustrated in FIG. 2, the streaming distribution device 210 illustrated in FIG. 12, the streaming distribution device 220 illustrated in FIG. 14, the streaming distribution device 230 illustrated in FIG. 16, the streaming distribution device 240 illustrated in FIG. 20, or the like.

Next, an advantageous effect of the bitrate instruction device 71 according to the seventh example embodiment will be described.

The bitrate instruction device 71 according to the seventh example embodiment can improve communication quality of information in a short period of time via a communication network. The reason is that it is possible that a bitrate is calculated over a long period, compared with the communication device disclosed in PTL 1, and communication is controlled in accordance with the calculated bitrate. Therefore, the number of times of control of communication decreases, compared with the communication device disclosed in PTL 1, and therefore, the bitrate instruction device 71 according to the present example embodiment can achieve high-quality communication of information in a short period of time.

Eighth Example Embodiment

Next, an eighth example embodiment of the present invention will be described.

In the following description, a characteristic portion according to the present example embodiment will be mainly described, and a component similar to a corresponding component of each example embodiment described above is assigned with the same reference sign, and thereby overlapping description will be omitted.

Figure 23:
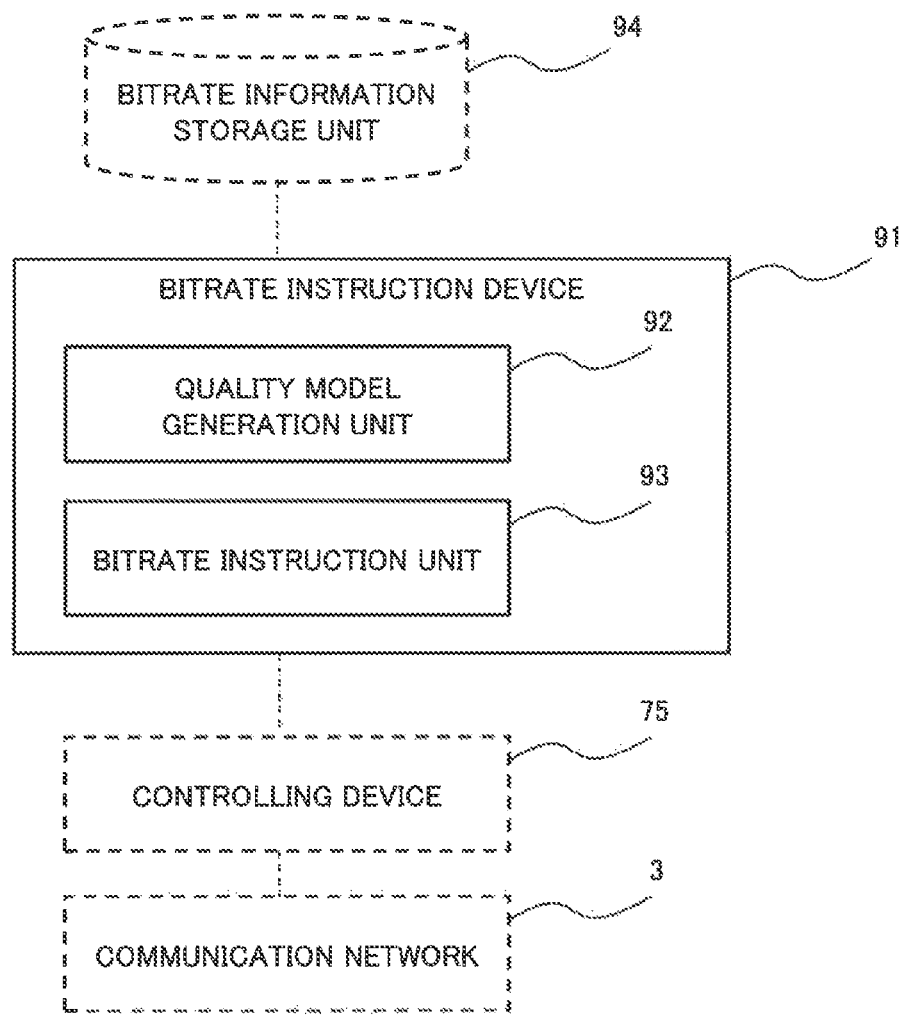
FIG. 23 is a block diagram illustrating a configuration of a bitrate instruction device according to an eighth example embodiment of the present invention.

With reference to FIG. 23, a configuration of a bitrate instruction device 91 according to the eighth example embodiment of the present invention will be described in detail. FIG. 23 is a block diagram illustrating a configuration of the bitrate instruction device 91 according to the eighth example embodiment of the present invention.

The bitrate instruction device 91 according to the eighth example embodiment of the present invention includes a quality model generation unit (quality model generator) 92 and a bitrate instruction unit (bitrate instructor) 93.

The bitrate instruction device 91 can be connected (or communicably connected) to a controlling device 75 that controls a communication network 3. The bitrate instruction device 71 can refer to a bitrate information storage unit 94 that stores a plurality of bitrate models as described with reference to FIG. 5, FIG. 13, FIG. 15, FIG. 17 to FIG. 19, FIG. 21, or the like. In other words, the bitrate instruction device 91 can refer to the bitrate information storage unit 94 that stores a plurality of bitrate models representing a change degree of a data volume per time of data communicated via the communication network 3 with a passage of time. The bitrate information storage unit 94 further stores an available bandwidth model representing a change degree of an available bandwidth related to the communication network 3 with a passage of time, and a possibility that the available bandwidth model occurs. For convenience of description, while it is assumed that the bitrate information storage unit 94 stores an available bandwidth model, an available bandwidth model related to the communication network 3 may be generated, for example, by the available bandwidth unit 14 (FIG. 2) described in the first example embodiment.

The quality model generation unit 92 reads a bitrate model and an available bandwidth model stored in the bitrate information storage unit 94. The bitrate model represents a change degree of a data volume per time of data communicated via the communication network 3 with a passage of time. One example of the bitrate model is illustrated in FIG. 5 and the like. One example of the available bandwidth model is illustrated in FIG. 13, FIG. 15, and the like. The quality model generation unit 92 executes processing similar to processing as described with reference to FIG. 4A, FIG. 4B, FIG. 5 to FIG. 7, and the like, based on the read bitrate model and available bandwidth model, and thereby generates a quality model representing a change degree of communication quality executed in the communication network 3 with a passage of time. The quality model generation unit 92 generates a quality model (exemplarily illustrated in FIG. 7) for each bitrate model.

The bitrate instruction unit 93 reads a possibility that the available bandwidth model read by the quality model generation unit 92 occurs, from the bitrate information storage unit 94, and calculates, based on the read possibility, an expected value for a quality model generated for the available bandwidth model by the quality model generation unit 92. The bitrate instruction unit 93 calculates an expected value for the quality model, for example, in accordance with processing similar to the processing described with reference to Eqn. 13 or Eqn. 14. The bitrate instruction unit 93 calculates the expected value for each bitrate model.

The bitrate instruction unit 93 selects, among bitrate models included in the bitrate information storage unit 94, a bitrate model in which an expected value of a quality model calculated for the bitrate model is large. The bitrate instruction unit 93 transmits, to a controlling device 75 that controls the communication network 3, request information for requesting a communication speed to be controlled in accordance with the selected bitrate model.

The controlling device 75 receives the request information transmitted by the bitrate instruction unit 93, and controls communication in the communication network 3, in accordance with a bitrate model instructed by the received request information.

The quality model generation unit 92 can be achieved, for example, by using a function included in the quality model generation unit 17 illustrated in FIG. 2. The bitrate instruction unit 93 can be achieved by using a function included in the bitrate model selection unit 18, a function included in the transmission unit 13, and the like illustrated in FIG. 2. In summary, the bitrate instruction device 91 can be achieved by using a function included in the streaming distribution device 1 illustrated in FIG. 2, the streaming distribution device 210 illustrated in FIG. 12, the streaming distribution device 220 illustrated in FIG. 14, the streaming distribution device 230 illustrated in FIG. 16, the streaming distribution device 240 illustrated in FIG. 20, or the like.

Next, an advantageous effect of the bitrate instruction device 91 according to the eighth example embodiment will be described.

The bitrate instruction device 91 according to the eighth example embodiment, when it is difficult to uniquely determine a communication bandwidth in a certain period with respect to the communication network 3, can improve communication quality of information in a short period of time. The reason is that expected communication quality is calculated based on an occurrence possibility of an available bandwidth with respect to the communication network 3.

Further, also with regard to a streaming distribution device or a bitrate instruction device according to each example embodiment of the present invention, a similar advantageous effect is produced based on a reason similar to the reason described above.

(Hardware Configuration Example)

A configuration example of hardware resources that achieve each streaming distribution device according to the first to sixth example embodiments of the present invention or each bitrate instruction device according to the seventh to eighth example embodiments will be described. However, the streaming distribution device or the bitrate instruction device may be achieved using physically or functionally at least two calculation processing devices. Further, the streaming distribution device or the bitrate instruction device may be achieved as a dedicated device.

Figure 24:
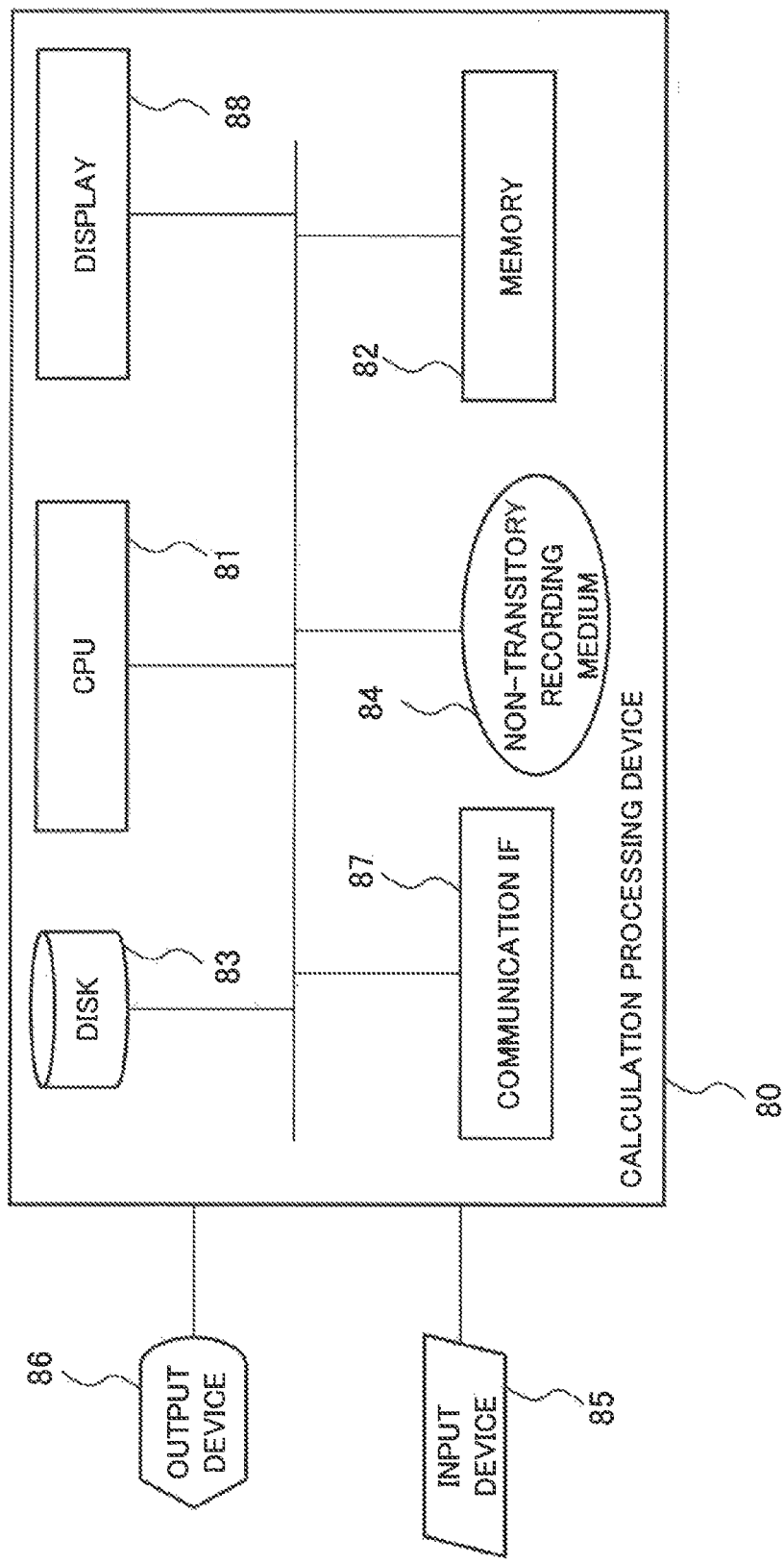
FIG. 24 is a block diagram schematically illustrating a hardware configuration of a calculation processing device capable of achieving each streaming distribution device or each bitrate instruction device according to the each example embodiment.

FIG. 24 is a block diagram schematically illustrating a hardware configuration of a calculation processing device capable of achieving each streaming distribution device according to the first to sixth example embodiments or each bitrate instruction device according to the seventh to eighth example embodiments. A calculation processing device 80 includes a central processing unit (CPU) 81, a memory 82, a disk 83, a non-transitory recording medium 84. The calculation processing device 80 further includes a communication interface (hereinafter, expressed as. "communication I/F") 87 and a display 88. The calculation processing device 80 may connect an input device 85 and an output device 86. The calculation processing device 80 can execute transmission/reception of information to/from another calculation processing device and a communication device via the communication I/F 87.

The non-transitory recording medium 84 is, for example, a computer-readable Compact Disc, Digital Versatile Disc. The non-transitory recording medium 84 may be Universal Serial Bus (USB) memory, Solid State Drive or the like. The non-transitory recording medium 84 allows a related program to be holdable and portable without power supply. The non-transitory recording medium 84 is not limited to the above-described media. Further, a related program can be carried via a communication network by way of the communication I/F 87 instead of the non-transitory recording medium 84.

In other words, the CPU 81 copies, on the memory 82, a software program (a computer program: hereinafter, referred to simply as a "program") stored in the disk 83 when executing the program and executes arithmetic processing. The CPU 81 reads data necessary for program execution from the memory 82. When display is needed, the CPU 81 displays an output result on the display 88. When output is needed, the CPU 81 outputs an output result to the output device 86. When a program is input from the outside, the CPU 81 reads the program from the input device 85. The CPU 81 interprets and executes a streaming distribution program (FIG. 3, FIG. 4A, FIG. 4B, or FIG. 11) or a bitrate instruction program present on the memory 82 corresponding to a function (processing) indicated by each unit illustrated in FIG. 1, FIG. 2, FIG. 9, FIG. 12, FIG. 14, FIG. 16, FIG. 20, FIG. 22, or FIG. 23 described above. The CPU 81 sequentially executes the processing described in each example embodiment of the present invention.

In other words, in such a case, it is conceivable that the present invention can also be made using the streaming distribution program or the bitrate instruction program. Further, it is conceivable that the present invention can also be made using a computer-readable, non-transitory recording medium storing the streaming distribution program or the bitrate instruction program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

A part of or all of the above-described example embodiments may be described as the following supplementary notes. However, the present invention exemplarily described in the above-described example embodiments is not limited to the following.

(Supplementary Note 1)

A bitrate instruction device comprising:

quality model generation means for generating a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and bitrate instruction means for calculating an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

(Supplementary Note 2)

The bitrate instruction device according to supplementary note 1, further comprising:

available bandwidth means for calculating the occurrence possibility that the communication bandwidth at a certain time is a certain available bandwidth based on a plurality of the available bandwidth models, wherein the bitrate instruction means calculates the expected value based on the occurrence possibility calculated by the available bandwidth means.

(Supplementary Note 3)

The bitrate instruction device according to supplementary note 2, wherein the available bandwidth means determines a bandwidth for the certain available bandwidth based on redundant processing power of the bitrate instruction device.

(Supplementary Note 4)

The bitrate instruction device according to any one of supplementary notes 1 to 3, further comprising:

delay model generation means for generating a delay model based on a difference between the bitrate model and the available bandwidth model, the delay model representing a change degree of a delay time for a communication via the communication network with the passage of time, wherein the quality model generation means generates the quality model based on the delay model, the bitrate model, and the delay model.

(Supplementary Note 5)

The bitrate instruction device according to any one of supplementary notes 1 to 4, wherein the bitrate instruction means selects a bitrate model with a maximum or a substantially maximum expected value of the quality represented by the quality model.

(Supplementary Note 6)

The bitrate instruction device according to any one of supplementary notes 1 to 5, further comprising:

bitrate information storage means for storing the bitrate information, wherein the bitrate information includes values of a probability distribution of the communication bandwidth determined based on the available bandwidth model for a first timing or later.

(Supplementary Note 7)

The bitrate instruction device according to supplementary note 6, wherein the bitrate models in the bitrate information are represented with a polygonal line composed of a plurality of straight lines.

(Supplementary Note 8)

The bitrate instruction device according to supplementary note 6 or supplementary note 7, wherein the bitrate model has negative inclination until a second timing before the first timing, positive inclination between the second timing and the first timing, and zero or substantially zero inclination after the first timing.

(Supplementary Note 9)

The bitrate instruction device according to supplementary note 6 or supplementary note 7, wherein the bitrate model has positive inclination before the first timing and zero or substantially zero inclination after the first timing.

(Supplementary Note 10)

The bitrate instruction device according to supplementary note 8, further comprising:

parameter calculation means for calculating, as parameters, the positive inclination, the negative inclination, and the second timing in case of satisfying a condition that data volume stored in a buffer is zero or substantially zero at the first timing and storing the bitrate model specified by the calculated parameters in the bitrate information storage means, the buffer being a first-in-first-out buffer storing data to be a target of delayed communication processing in the communication network.

(Supplementary Note 11)

The bitrate instruction device according to any one of supplementary notes 5 to 10, wherein the bitrate information includes a bitrate model represented by an exponential function that approaches the communication bandwidth represented by the available bandwidth model as a time passes.

(Supplementary Note 12)

A bitrate instruction method by information processing apparatus, the method comprising:

generating a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and calculating an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

(Supplementary Note 13)

A recoding medium storing a bitrate instruction program, the program making a computer achieve:

a quality model generation function for generating a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and a bitrate instruction function for calculating an expected value of the generated quality model based on occurrence possibility of the available bandwidth model, and instructing a controller of the communication to control communication data volume per time in accordance with a bitrate model with higher expected value than that of other bitrate models in the plurality of the bitrate models included in the bitrate information.

REFERENCE SIGNS LIST 1 streaming distribution device
2 streaming receiving device
3 communication network
4 streaming distribution system
11 stream data input unit
12 encode unit
13 transmission unit
14 available bandwidth unit
15 buffer volume estimation unit
16 delay model generation unit
17 quality model generation unit
18 bitrate model selection unit
19 transmission delay estimation unit
20 bitrate information storage unit
5 communication network
6 streaming distribution system
51 base station device
52 mobile core network
53 internet
131 transmission buffer
21 bitrate information storage unit
210 streaming distribution device
22 bitrate information storage unit
220 streaming distribution device
23 bitrate information storage unit
230 streaming distribution device
24 bitrate information storage unit
240 streaming distribution device
71 bitrate instruction device
72 quality model generation unit
73 delay model generation unit
74 bitrate instruction unit
75 controlling device
76 bitrate information
80 calculation processing device
81 CPU
82 memory
83 disk
84 non-transitory recording medium
85 input device
86 output device
87 communication IF
88 display
91 bitrate instruction device
92 quality model generation unit
94 bitrate instruction unit

The invention claimed is:

1. A bitrate instruction device comprising:

a quality model generator configured to generate a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time; and a bitrate instructor configured to calculate an expected value of the generated quality model based on occurrence possibility of the available bandwidth model, and instruct a controller of the communication to control communication data volume per time in accordance with a bitrate model with higher expected value than that of other bitrate models in the plurality of the bitrate models included in the bitrate information, and a bitrate information storage configured to store the bitrate information, wherein the bitrate information includes values of a probability distribution of the communication bandwidth determined based on the available bandwidth model for a first timing or later, and the bitrate models in the bitrate information are represented with a polygonal line composed of a plurality of straight lines.

2. The bitrate instruction device according to claim 1, further comprising:

an available bandwidth unit configured to calculate the occurrence possibility that the communication bandwidth at a certain time is a certain available bandwidth based on a plurality of the available bandwidth models, wherein the bitrate instructor calculates the expected value based on the occurrence possibility calculated by the available bandwidth unit.

3. The bitrate instruction device according to claim 2, wherein the available bandwidth unit determines a bandwidth for the certain available bandwidth based on redundant processing power of the bitrate instruction device.

4. The bitrate instruction device according to claim 1, further comprising:

a delay model generator configured to generate a delay model based on a difference between the bitrate model and the available bandwidth model, the delay model representing a change degree of a delay time for a communication via the communication network with the passage of time, wherein the quality model generator generates the quality model based on the available bandwidth model, the bitrate model, and the delay model.

5. The bitrate instruction device according to claim 1, wherein the bitrate instructor selects a bitrate model with a maximum or a substantially maximum expected value of the quality represented by the quality model.

6. The bitrate instruction device according to claim 5, wherein the bitrate information includes a bitrate model represented by an exponential function that approaches the communication bandwidth represented by the available bandwidth model as a time passes.

7. A bitrate instruction device comprising:

a quality model generator configured to generate a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time;

a bitrate instructor configure to calculate an expected value of the generated quality model based on occurrence possibility of the available bandwidth model, and instruct a controller of the communication to control communication data volume per time in accordance with a bitrate model with higher expected value than that of other bitrate models in the plurality of the bitrate models included in the bitrate information, and a bitrate information storage configured to store the bitrate information, wherein the bitrate information includes values of a probability distribution of the communication bandwidth determined based on the available bandwidth model for a first timing or later, and the bitrate model has negative inclination until a second timing before the first timing, positive inclination between the second timing and the first timing, and zero or substantially zero inclination after the first timing.

8. The bitrate instruction device according to claim 7, further comprising:

an available bandwidth unit configured to calculate the occurrence possibility that the communication bandwidth at a certain time is a certain available bandwidth based on a plurality of the available bandwidth models, wherein the bitrate instructor calculates the expected value based on the occurrence possibility calculated by the available bandwidth unit.

9. The bitrate instruction device according to claim 8, wherein the available bandwidth unit determines a bandwidth for the certain available bandwidth based on redundant processing power of the bitrate instruction device.

10. The bitrate instruction device according to claim 7, further comprising:

a delay model generator configured to generate a delay model based on a difference between the bitrate model and the available bandwidth model, the delay model representing a change degree of a delay time for a communication via the communication network with the passage of time, wherein the quality model generator generates the quality model based on the available bandwidth model, the bitrate model, and the delay model.

11. The bitrate instruction device according to claim 7, wherein the bitrate instructor selects a bitrate model with a maximum or a substantially maximum expected value of the quality represented by the quality model.

12. The bitrate instruction device according to claim 7, further comprising:

a parameter calculator configured to calculate, as parameters, the positive inclination, the negative inclination, and the second timing in case of satisfying a condition that data volume stored in a buffer is zero or substantially zero at the first timing and store the bitrate model specified by the calculated parameters in the bitrate information storage, the buffer being a first-in-first-out buffer storing data to be a target of delayed communication processing in the communication network.

13. The bitrate instruction device according to claim 11, wherein
the bitrate information includes a bitrate model represented by an exponential function that approaches the communication bandwidth represented by the available bandwidth model as a time passes.

14. A bitrate instruction device comprising:
a quality model generator configured to generate a quality model that represents a change degree of communication quality with a passage of time based on a bitrate model in bitrate information and an available bandwidth model, the bitrate model representing a change degree per time of communication data volume via a communication network with the passage of time, the bitrate information including a plurality of the bitrate models, and the available bandwidth model representing a change degree of communication bandwidth of the communication network with the passage of time;
a bitrate instructor configured to calculate an expected value of the generated quality model based on occurrence possibility of the available bandwidth model, and instruct a controller of the communication to control communication data volume per time in accordance with a bitrate model with higher expected value than that of other bitrate models in the plurality of the bitrate models included in the bitrate information, and
a bitrate information storage configured to store the bitrate information, wherein
the bitrate information includes values of a probability distribution of the communication bandwidth determined based on the available bandwidth model for a first timing or later, and
the bitrate model has positive inclination before the first timing and zero or substantially zero inclination after the first timing.

15. The bitrate instruction device according to claim 14, further comprising:
an available bandwidth unit configured to calculate the occurrence possibility that the communication bandwidth at a certain time is a certain available bandwidth based on a plurality of the available bandwidth models, wherein
the bitrate instructor calculates the expected value based on the occurrence possibility calculated by the available bandwidth unit.

16. The bitrate instruction device according to claim 15, wherein
the available bandwidth unit determines a bandwidth for the certain available bandwidth based on redundant processing power of the bitrate instruction device.

17. The bitrate instruction device according to claim 14, further comprising:
a delay model generator configured to generate a delay model based on a difference between the bitrate model and the available bandwidth model, the delay model representing a change degree of a delay time for a communication via the communication network with the passage of time, wherein
the quality model generator generates the quality model based on the available bandwidth model, the bitrate model, and the delay model.

18. The bitrate instruction device according to claim 14, wherein
the bitrate instructor selects a bitrate model with a maximum or a substantially maximum expected value of the quality represented by the quality model.

19. The bitrate instruction device according to claim 18, wherein
the bitrate information includes a bitrate model represented by an exponential function that approaches the communication bandwidth represented by the available bandwidth model as a time passes.

* * * * *